US012521082B2

(12) United States Patent
Dikovsky et al.

(10) Patent No.: US 12,521,082 B2
(45) Date of Patent: Jan. 13, 2026

(54) ADDITIVE MANUFACTURING OF RADIOLOGICAL PHANTOMS

(71) Applicant: Stratasys Ltd., Rehovot (IL)

(72) Inventors: Daniel Dikovsky, Ariel (IL); Diana Ravich, Natania (IL); Avraham Levy, Petach-Tikva (IL); Ben Klein, Tel-Aviv (IL)

(73) Assignee: Stratasys Ltd., Rehovot (IL)

( * ) Notice: Subject to any disclaimer, the term of this patent is extended or adjusted under 35 U.S.C. 154(b) by 959 days.

(21) Appl. No.: 17/419,845

(22) PCT Filed: Dec. 30, 2019

(86) PCT No.: PCT/IL2019/051439
§ 371 (c)(1),
(2) Date: Jun. 30, 2021

(87) PCT Pub. No.: WO2020/141519
PCT Pub. Date: Jul. 9, 2020

(65) Prior Publication Data
US 2022/0079547 A1    Mar. 17, 2022

Related U.S. Application Data

(60) Provisional application No. 62/786,793, filed on Dec. 31, 2018.

(51) Int. Cl.
*B33Y 70/00* (2020.01)
*A61B 6/58* (2024.01)
(Continued)

(52) U.S. Cl.
CPC ............ *A61B 6/583* (2013.01); *B29C 64/112* (2017.08); *B33Y 10/00* (2014.12); *B33Y 70/00* (2014.12); *B29K 2995/0018* (2013.01)

(58) Field of Classification Search
None
See application file for complete search history.

(56) References Cited

U.S. PATENT DOCUMENTS 6,259,962 B1    7/2001 Gothait
6,569,373 B2    5/2003 Napadensky
(Continued)

FOREIGN PATENT DOCUMENTS

CN    101256849    9/2008
CN    105101935    11/2015
(Continued)

OTHER PUBLICATIONS

Artola et al: "Elimination of barium sulphate from acrylic bone cements. Use of two iodine-containing monomers", Biomaterials, Elsevier, Amsterdam, NL, vol. 24, No. 22, Oct. 1, 2003, pp. 4071-4080 (Year: 2003).*

(Continued)

*Primary Examiner* — Mohammad M Ameen

(57) ABSTRACT

A formulation usable as a modeling material formulation in additive manufacturing of a three-dimensional object and additive manufacturing methods utilizing same are provided. The formulation comprises one or more curable materials; and a radiopaque material, and features, when hardened, a CT number of at least 100 HU at 70 kV. Objects made by the additive manufacturing method utilizing the formulation are usable as radiological phantoms.

19 Claims, 6 Drawing Sheets

(51) Int. Cl.
  *B29C 64/112* (2017.01)
  *B33Y 10/00* (2015.01)

(56) References Cited

U.S. PATENT DOCUMENTS

| | | | |
|---|---|---|---|
| 6,658,314 | B1 | 12/2003 | Gothait |
| 6,850,334 | B1 | 2/2005 | Gothait |
| 7,183,335 | B2 | 2/2007 | Napadensky |
| 7,209,797 | B2 | 4/2007 | Kritchman et al. |
| 7,225,045 | B2 | 5/2007 | Gothait |
| 7,300,619 | B2 | 11/2007 | Napadensky et al. |
| 7,479,510 | B2 | 1/2009 | Napadensky et al. |
| 7,500,846 | B2 | 3/2009 | Eshed et al. |
| 7,962,237 | B2 | 6/2011 | Kritchman |
| 9,031,680 | B2 | 5/2015 | Napadensky |
| 9,227,365 | B2 | 1/2016 | Dikovsky et al. |
| 9,364,986 | B1 * | 6/2016 | Patterson ............... B33Y 10/00 |
| 2003/0207959 | A1 | 11/2003 | Napadensky et al. |
| 2006/0036316 | A1 * | 2/2006 | Zeltinger ............... C08G 64/18 623/1.49 |
| 2010/0191360 | A1 | 7/2010 | Napadensky |
| 2016/0113846 | A1 | 4/2016 | Willner |
| 2016/0256711 | A1 * | 9/2016 | Pappas .................. A61N 5/1075 |
| 2017/0224591 | A1 * | 8/2017 | Vogel ........................ A61K 6/78 |
| 2018/0104946 | A1 | 4/2018 | Bentz et al. |
| 2020/0354542 | A1 * | 11/2020 | O'Sullivan .............. C08K 3/22 |

FOREIGN PATENT DOCUMENTS

| | | |
|---|---|---|
| CN | 106061554 | 10/2016 |
| CN | 106659640 | 5/2017 |
| CN | 108367494 | 8/2018 |
| EP | 2 990 061 A1 * | 3/2016 |
| EP | 2990061 | 3/2016 |
| JP | 2005-111988 | 4/2005 |
| JP | 2014-531503 | 11/2014 |
| JP | 2015-43793 | 3/2015 |
| JP | 2016-536085 | 11/2016 |
| JP | 2016-536434 | 11/2016 |
| WO | WO 2016/103973 | 6/2016 |
| WO | WO 2016/142947 | 9/2016 |
| WO | WO 2017/029657 | 2/2017 |
| WO | WO 2017/122211 | 7/2017 |
| WO | WO 2018/222779 | 12/2018 |
| WO | WO 2019/021291 | 1/2019 |
| WO | WO 2019/021292 | 1/2019 |
| WO | WO 2019/021293 | 1/2019 |
| WO | WO 2019/021294 | 1/2019 |
| WO | WO 2019/021295 | 1/2019 |
| WO | WO 2019/211420 | 11/2019 |
| WO | WO 2020/141519 | 7/2020 |
| WO | WO 2020/141519 A8 | 10/2020 |

OTHER PUBLICATIONS

Davy et al.: X-Ray opaque methacrylate polymers for biomedical applications; Polymer International 43 (1997) pp. 143-154 (Year: 1997).*

Communication Pursuant to Article 94(3) EPC Dated Sep. 5, 2023 From the European Patent Office Re. Application No. 19839160.9. (6 Pages).

Notice of Reason(s) for Rejection Dated Sep. 12, 2023 From the Japan Patent Office Re. Application No. 2021-538300. (3 pages).

International Preliminary Report on Patentability Dated Jul. 15, 2021 From the International Bureau of WIPO Re. Application No. PCT/IL2019/051439. (8 Pages).

International Search Report and the Written Opinion Dated Apr. 24, 2020 From the International Searching Authority Re. Application No. PCT/IL2019/051439. (11 Pages).

Artola et al. "Elimination of Barim Sulphate From Acrylic Bone Cements. Use of Two Iodine-Containing Monomers", Biomaterials, XP004434250, 24(22): 4071-4080, Oct. 2003.

Badal et al. "Reproducing Two-Dimensional Mammograms With Three-Dimensional Printed Phantoms", Journal of Medical Imaging, 5(3): 033501-1-0533501-10, Published Online Jul. 12, 2018.

FitzGerald et al. "CT Image Contrast of High-Z Elements: Phantom Imaging Studies and Clinical Implications", Radiology, 278(3): 723-733, Published Online Sep. 10, 2015.

Gear et al. "Abdo-Man: A 3D-Printed Anthropomorphic Phantom for Validating Quantitative SIRT", EJNMMI Physics, 3(1): 17-1-17-16, Published Online Aug. 5, 2016.

Mitsouras et al. "Medical 3D Printing for Radiologist", RadioGraphics, 35(7):1965-1988, Published Online Nov. 12, 2015. & Appendix.

Mitsouras et al. "Three-Dimensional Printing of MRI-Visible Phantoms and MR Image-Guided Therapy Simulation", Magnetic Resonance in Medicine, 77(2): 613-622, Published Online Feb. 11, 2016. & Supporting Table.

Translation Dated Oct. 4, 2023 of Notice of Reason(s) for Rejection Dated Sep. 12, 2023 From the Japan Patent Office Re. Application No. 2021-538300. (6 pages).

English Summary Dated Dec. 25, 2023 of Notification of Office Action and Search Report Dated Dec. 12, 2023 From the State Intellectual Property Office of the People's Republic of China Re. Application No. 201980090051.9 (2 Pages).

Notification of Office Action and Search Report Dated Dec. 12, 2023 From the State Intellectual Property Office of the People's Republic of China Re. Application No. 201980090051.9 and Its Machine Translation Into English. (16 Pages).

Notice of Reason(s) for Rejection Dated Feb. 13, 2023 From the Japan Patent Office Re. Application No. 2021-538300. (3 pages).

Translation Dated Feb. 28, 2024 of Notice of Reason(s) for Rejection Dated Feb. 13, 2023 From the Japan Patent Office Re. Application No. 2021-538300. (6 pages).

Decision on Rejection Dated Jul. 27, 2024 From the State Intellectual Property Office of the People's Republic of China Re. Application No. 201980090051.9. and Its Machine Translation Into English. (13 Pages).

English Summary Dated Aug. 6, 2024 of Decision on Rejection Dated Jul. 27, 2024 From the State Intellectual Property Office of the People's Republic of China Re. Application No. 201980090051. 9. (2 Pages).

Office Action Dated Jun. 13, 2024 From the Israel Patent Office Re. Application No. 284522. (4 Pages).

* cited by examiner

ADDITIVE MANUFACTURING OF RADIOLOGICAL PHANTOMS

RELATED APPLICATIONS

This application is a National Phase of PCT Patent Application No. PCT/IL2019/051439 having International filing date of Dec. 30, 2019, which claims the benefit of priority under 35 USC § 119 (e) of U.S. Provisional Patent Application No. 62/786,793 filed on Dec. 31, 2018. The contents of the above applications are all incorporated by reference as if fully set forth herein in their entirety.

FIELD AND BACKGROUND OF THE INVENTION

The present invention, in some embodiments thereof, relates to additive manufacturing and, more particularly, but not exclusively, to novel formulations which are usable in additive manufacturing of radiological phantoms.

Additive manufacturing is generally a process in which a three-dimensional (3D) object is manufactured utilizing a computer model of the objects. Such a process is used in various fields, such as design related fields for purposes of visualization, demonstration and mechanical prototyping, as well as for rapid manufacturing (RM).

The basic operation of any AM system consists of slicing a three-dimensional computer model into thin cross sections, translating the result into two-dimensional position data and feeding the data to control equipment which manufacture a three-dimensional structure in a layerwise manner.

Various AM technologies exist, amongst which are stereolithography, digital light processing (DLP), and other three-dimensional (3D) printing technologies, 3D inkjet printing in particular. Such techniques are generally performed by layer by layer deposition and solidification of one or more building materials, typically photopolymerizable (photocurable) materials.

In three-dimensional printing processes, for example, a building material is dispensed from a printing head having a set of nozzles or nozzle arrays to deposit layers on a supporting structure. Depending on the building material, the layers may then solidify, harden or cure, optionally using a suitable device.

Various three-dimensional printing techniques exist and are disclosed in, e.g., U.S. Pat. Nos. 6,259,962, 6,569,373, 6,658,314, 6,850,334, 7,183,335, 7,209,797, 7,225,045, 7,300,619, 7,479,510, 7,500,846, 7,962,237 and 9,031,680, all of the same Assignee, the contents of which are hereby incorporated by reference.

The building materials may include modeling materials and support materials, which form the object and the temporary support constructions supporting the object as it is being built, respectively. The modeling material (which may include one or more material(s)) is deposited to produce the desired object/s and the support material (which may include one or more material(s)) is used, with or without modeling material elements, to provide support structures for specific areas of the object during building and assure adequate vertical placement of subsequent object layers, e.g., in cases where objects include overhanging features or shapes such as curved geometries, negative angles, voids, and so on.

Both the modeling and support materials are preferably liquid at the working temperature at which they are dispensed, and subsequently harden or solidify, typically upon exposure to a curing condition, typically curing energy (e.g., UV curing), to form the required layer shape. After printing completion, support structures are removed to reveal the final shape of the fabricated 3D object.

Several additive manufacturing processes allow additive formation of objects using more than one modeling material, also referred to as "multi-material" AM processes. For example, U.S. patent application having Publication No. 2010/0191360, by the present Assignee, discloses a system which comprises a solid freeform fabrication apparatus having a plurality of print heads, a building material supply apparatus configured to supply a plurality of building materials to the fabrication apparatus, and a control unit configured for controlling the fabrication and supply apparatus. The system has several operation modes. In one mode, all printing heads operate during a single building scan cycle of the fabrication apparatus. In another mode, one or more of the printing heads is not operative during a single building scan cycle or part thereof.

In a 3D inkjet printing process such as Polyjet™ (Stratasys Ltd., Israel), the building material is selectively jetted from one or more printing heads or from one or more nozzle arrays and deposited onto a fabrication tray in consecutive layers according to a pre-determined configuration as defined by a software file.

U.S. Pat. No. 9,227,365, by the present Assignee, discloses methods and systems for solid freeform fabrication of shelled objects, constructed from a plurality of layers and a layered core constituting core regions and a layered shell constituting envelope regions. These methodologies are referred to also as Digital ABS, or D-ABS.

Current PolyJet™ technology offers the capability to use a range of curable (e.g., polymerizable) materials that provide polymeric materials featuring a variety of properties, ranging, for example, from stiff and hard materials (e.g., curable formulations marketed as the Vero™ Family materials) to soft and flexible materials (e.g., curable formulations marketed as the Tango™ and Agilus™ families), and including also objects made using Digital ABS, which contain a shelled multi-material made of two starting materials (e.g., RGD515 & RGD535/531), and simulate properties of engineering plastic. Most of the currently practiced PolyJet materials are curable materials which harden or solidify upon exposure to radiation, mostly UV radiation and/or heat.

In order to be compatible with most of the commercially-available printing heads utilized in a 3D inkjet printing system, the uncured building material should feature the following characteristics: a relatively low viscosity (e.g., Brookfield Viscosity of up to 50 cps, or up to 35 cps, preferably from 8 to 25 cps) at the working (e.g., jetting) temperature; Surface tension of from about 25 to about 55 Dyne/cm, preferably from about 25 to about 40 Dyne/cm; and a Newtonian liquid behavior and high reactivity to a selected curing condition, to enable fast solidification of the jetted layer upon exposure to a curing condition, of no more than 1 minute, preferably no more than 20 seconds. Additional requirements include low boiling point solvents (if solvents are used), e.g., featuring a boiling temperature lower than 200 or lower than 190° C., yet characterized preferably by low evaporation rate at the working (e.g., jetting) temperature, and, if the building material includes solid particles, these should feature an average size of no more than 2 microns.

An imaging phantom, also referred to herein an in the art simply as "phantom", is a specially designed object that is used in biomedical imaging to evaluate, analyze, calibrate and tune the performance of an imaging device.

A "phantom" structure is intended to simulate an object of interest, such as an entire body or portion thereof to be evaluated with the imaging technique and is preferably fabricated to emulate physical characteristics of a body and its tissue.

A phantom used to evaluate an imaging device should respond in a similar manner to how human tissues and organs would act in that specific imaging modality. For example, in case of radiological imaging techniques, a radiological phantom should have X-ray absorbing properties and/or properties' profile similar to those of a normal tissue in order to tune the contrast of the imaging device or modulate the patients' exposure to radiation.

Radiocontrast agents are substances used to enhance the visibility of internal structures in X-ray-based imaging techniques such as computed tomography (CT). The radiocontrast agents typically exhibit radiopacity or radiodensity, which is opacity (inhibition of passage) to the radio wave and X-ray portion of the electromagnetic radiation. Radiopacity accounts for the white appearance of, for example, bones, in radiographs. Radiocontrast agents are typically materials that include high atomic number elements and/or high-density liquid materials. Such materials are also referred to herein and in the art as "radiopaque agents".

The performance of radiocontrast agents is measured on a Hounsfield scale, using the non-dimensional Hounsfield units (HU). In the Hounsfield scale, distilled water exhibits 0 HU, air exhibits −1000 HU, and bones exhibit 3000 HU.

Commonly used radiocontrast agents typically include iodine, barium or gadolinium. Several alternatives have been described in the art. Currently, iodine-containing compounds such as KI or Iodixanol ($C_{35}H_{44}I_6N_6O_{15}$) are the only high density radiocontrast agents that are used in intravascular applications, and possible alternatives to iodine, including, for example, $Ba(NO_3)_2$, $GdCl_3$, tantalum-based compounds and $Bi(NO_3)_3$ are described, for example, in FitzGerald et al., *CT image Contrast of High-Z elements: Phantom Imaging Studies and Clinical Implications*, Radiology 2016; 278(3), 723-733. Radiocontrast agents that are currently in use in medical devices like catheters include barium sulfate particles, Bismuth-based compounds such as $Bi_2O_2CO_3$, BiOCl, and Tungsten (W) particles.

Additive manufacturing of radiological phantoms used in two-dimensional and three-dimensional radiological imaging modalities such as radiography (e.g., memography), XRD, CT, MRI, PET and/or SPECT, is described in, for example, Badal et al., J. Med. Imag. 5(3), 033501 (2018); Gear et al. EJNMMI Physics (2016) 3:17; Mitsouras et al., RadioGraphics 2015; 35:1965-1988; Mitsouras et al. Magnetic Resonance in Medicine 00:00-00 (2016); and U.S. patent application having Publication No. US 2018/0104946. These documents teach additive manufacturing using polymerizable materials.

Additional background art includes U.S. patent application having Publication No. 2003/0207959; PCT International Patent Applications having Publication Nos. WO 2016/142947; WO 2017/029657; and WO 2017/122211, and PCT International Patent Application Nos. PCT/IL2018/050839; PCT/IL2018/050840; PCT/IL2018/050841; PCT/IL2018/050842; and PCT/IL2018/050843.

SUMMARY OF THE INVENTION

According to an aspect of some embodiments of the present invention there is provided a modeling material formulation usable in additive manufacturing of a three-dimensional object, the formulation comprising: one or more curable materials; and a radiopaque material, the formulation featuring, when hardened, a CT number of at least 100 HU at 70 kV.

According to some of any of the embodiments described herein, the formulation features, when hardened, a CT number of at least 500 HU at 70 kV, or of at least 1000 HU, or of at least 2000 HU.

According to some of any of the embodiments described herein, the three-dimensional object is a radiological phantom.

According to some of any of the embodiments described herein, the additive manufacturing is 3D inkjet printing.

According to some of any of the embodiments described herein, the formulation features a viscosity of from 8 to about 50, or from 8 to about 30, or from 8 to about 25, centipoises at 75° C.

According to some of any of the embodiments described herein, an amount of the radiopaque material ranges from 5 to 50%, or from 5 to 30%, or from 5 to 25%, by weight of the total weight of the formulation.

According to some of any of the embodiments described herein, the radiopaque material comprises a radiopaque element or a radiopaque compound comprising a radiopaque element.

According to some of any of the embodiments described herein, the radiopaque element is selected from iodine, tungsten, tantalum, gadolinium, Yttrium, gold, bismuth and barium.

According to some of any of the embodiments described herein, the radiopaque material is barium sulfate.

According to some of any of the embodiments described herein, the radiopaque material is in a form of nanoparticles or a nanopowder, optionally dispersed or dissolved in a liquid carrier.

According to some of any of the embodiments described herein, the radiopaque material is a liquid having a density of at least 2 grams/cm$^3$.

According to some of any of the embodiments described herein, the radiopaque material is a curable material containing one or more curable groups and one or more radiopaque elements or one or more groups containing a radiopaque element.

According to some of any of the embodiments described herein, the radiopaque element is selected from bromine and iodine.

According to some of any of the embodiments described herein, the radiopaque material comprises an opaque solid material dispersed in a curable formulation.

According to some of any of the embodiments described herein, the solid opaque material is an oxide such as alumina, titania and the like.

According to some of any of the embodiments described herein, the one or more curable materials comprise one or more monofunctional curable material(s) that features, when hardened, Tg higher than 50° C.

According to some of any of the embodiments described herein, a total amount of the monofunctional curable material(s) that features, when hardened, Tg higher than 50° C. is at least 20%, or is from 20% to 40%, or from 30 to 40%, by weight of total weight of the formulation.

According to some of any of the embodiments described herein, the one or more curable materials comprise one or more monofunctional curable material(s) that features, when hardened, Tg lower than 20° C.

According to some of any of the embodiments described herein, a total amount of the monofunctional curable material(s) that features, when hardened, Tg lower than 20° C. ranges from 1 to 20, or from 5 to 15, % by weight of the total weight of the formulation.

According to some of any of the embodiments described herein, the one or more curable materials comprise one or more multifunctional curable material(s) that features, when hardened, Tg higher than 50° C.

According to some of any of the embodiments described herein, a total amount of the multifunctional curable material(s) that features, when hardened, Tg higher than 50° C. ranges from 5% to 15%, or from 5 to 10%, by weight of total weight of the formulation.

According to some of any of the embodiments described herein, the one or more curable materials comprise one or more multifunctional curable material(s) that features, when hardened, Tg lower than 20° C.

According to some of any of the embodiments described herein, a total amount of the multifunctional curable material(s) that features, when hardened, Tg lower than 20° C. ranges from 10 to 30, or from 15 to 25, % by weight of the total weight of the formulation.

According to some of any of the embodiments described herein, the curable materials are UV-curable materials.

According to some of any of the embodiments described herein, the formulation further comprises a photoinitiator.

According to some of any of the embodiments described herein, an amount of the photoinitiator ranges from 1 to 10%, or from 2 to 10%, or from 2 to 6%, by weight of total weight of the formulation.

According to some of any of the embodiments described herein, the formulation further comprises a surfactant and/or dispersant.

According to an aspect of some embodiments of the present invention there is provided a method of additive manufacturing a three-dimensional object, the method comprising dispensing at least one modeling material formulation to sequentially form a plurality of layers in a configured pattern corresponding to a shape of the object, wherein for at least a portion of the layers, the at least one modeling material formulation is the formulation as described herein in any of the respective embodiments and any combination thereof.

According to some of any of the embodiments described herein, the dispensing in view one or more 3D inkjet printing arrays.

According to some of any of the embodiments described herein, the method further comprises exposing at least a portion of the dispensed layers to a curing condition to thereby obtain a hardened formulation featuring the CT number.

According to an aspect of some embodiments of the present invention there is provided a three-dimensional object comprising, in at least a portion thereof, a hardened material that features a CT number of at least 100 HU at 70 kV, obtained by the method as described herein in any of the respective embodiments and any combination thereof.

According to an aspect of some embodiments of the present invention there is provided a three-dimensional object comprising, in at least a portion thereof, a hardened material that features a CT number of at least 100 HU at 70 kV, obtained by exposing the formulation as described herein in any of the respective embodiments and any combination thereof to a curing condition that provides the hardened formulation.

According to some of any of the embodiments described herein, the object is for use as a radiological phantom.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

DESCRIPTION OF SPECIFIC EMBODIMENTS OF THE INVENTION

Figure 1A:
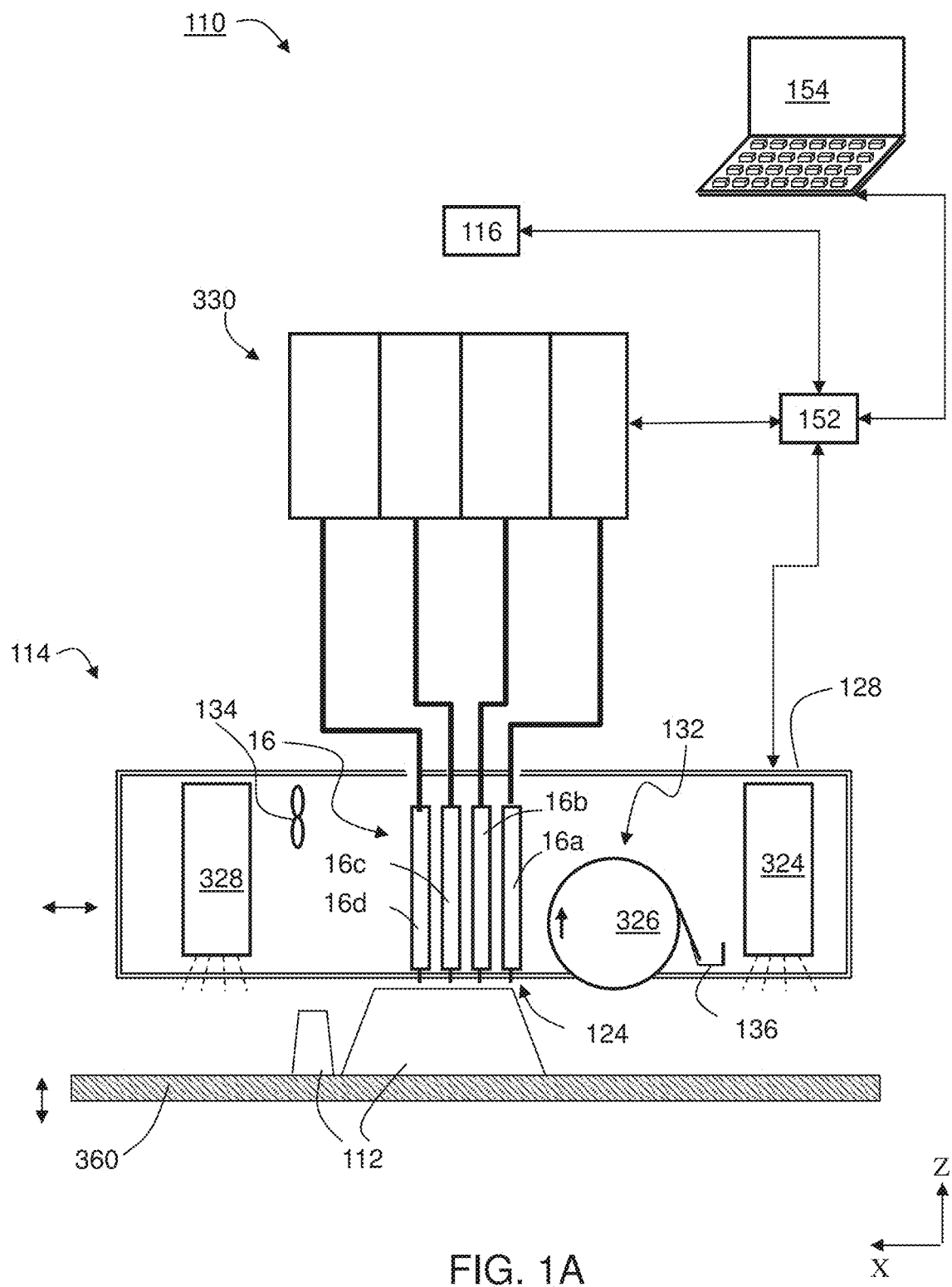
FIGS. 1A, 1B, 1C and 1D are schematic illustrations of an additive manufacturing system according to some embodiments of the invention.

The present invention, in some embodiments thereof, relates to additive manufacturing and, more particularly, but not exclusively, to novel formulations which are usable in additive manufacturing of radiological phantoms.

The need for methods of manufacturing radiological phantoms in a cost effective and reproducible manner has been recognized in the art and has led researchers to study additive manufacturing methodologies for fabricating models that can be used as phantoms for radioimaging (radiological phantoms). However, all of the currently disclosed methodologies provide models that are devoid of radiopaque (radiocontrast) agents that perform as radiological contrast agents, and therefore feature low radiopacity, within a limited range of, for example, up to 300 HU at 70 kV.

The present inventors have conceived modeling material formulations and additive manufacturing methods utilizing same, which provide 3D objects that exhibit enhanced radiopacity, and hence exhibit an improved performance as radiological phantoms, for example, by allowing more accurate evaluation and consequent calibration of the radioimaging device. The present inventors have designed and tested several formulations, some including solid particles that provide radiopacity, dispersed in a curable formulation, and some including curable materials that provide radiopacity mixed with a curable formulation, and have shown that such formulations can be successfully used in AM fabrication of radiological phantoms that exhibit improved radiopacity compared to AM-fabricated phantoms currently in practice.

More specifically, the data presented in the Examples section that follows show that curable formulations containing both curable and non-curable radiopaque materials can be successfully prepared and provide a desired radiopacity. Most formulations were found jettable and thus suitable for forming 3D objects using 3D inkjet printing systems, rendering such formulations usable in the advantageous fabrication of radiological phantoms.

The formulations are generally prepared by mixing the radiopaque material with a curable formulation, optionally while adding to this mixture additional surfactant/dispersant and/or an additional amount of a photoinitiator. All the tested formulations are curable upon exposure to UV radiation.

Substantially high radiopacity/radiodensity and good jettability was observed with formulations containing curable radiopaque materials, and with Barium Sulfate nanoparticles.

The curable formulation can be any commercially available or otherwise tailored curable formulation, as long as the formulation allows good dispersion or dissolution of the radiopaque materials, and good stability of the obtained dispersion or solution.

Embodiments of the present invention relate to novel formulations which are usable in additive manufacturing, such as 3D inkjet printing, of a three-dimensional object that exhibits radiopacity, and can be used as a radiological phantom, to kits comprising these formulations, to additive manufacturing utilizing these formulations and to 3D objects obtained thereby.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Embodiments of the present invention relate to novel formulations which are usable in additive manufacturing of three-dimensional objects that feature, in at least a portion thereof, radiopacity. The radiopacity is determined by Hounsfield units (HU) according to standard procedures known in the art.

Some embodiments of the present invention relate to formulations usable for fabricating three-dimensional objects that feature, in at least a portion thereof, radiopacity of at least 100 HU.

Some embodiments of the present invention relate to formulations usable for fabricating three-dimensional objects that feature, in at least a portion thereof, radiopacity of at least 500 HU.

Some embodiments of the present invention relate to formulations usable for fabricating three-dimensional objects that feature, in at least a portion thereof, radiopacity of at least 1000 HU.

In addition to the radiopacity of the objects formed thereby, the formulations described herein may be designed to provide, when hardened, modeling materials which feature a variety of properties, ranging, for example, from stiff and hard materials (e.g., similar to those obtained from curable formulations marketed as the Vero™ Family materials) to soft and flexible materials (e.g., similar to elastomeric materials obtained from curable formulations marketed as the Tango™ and Agilus™ families), objects made of multi-materials (e.g., PolyJet™ methodology), such as digital materials (DM methodology), as described herein, and shelled objects made using Digital ABS methodology, which contain a shelled multi-material made of two starting materials (e.g., similar to formulation systems marketed as RGD515™ & RGD535/531™), and simulate properties of engineering plastic, such as described, for example, in WO 2011/135496, WO 2018/055522 and WO 2018/055521.

Embodiments of the present invention further relate to kits in which the novel formulations disclosed herein are packaged.

Embodiments of the present invention further relate to a method of additive manufacturing a three-dimensional object using the formulations or formulation systems described herein.

The method of the present embodiments manufactures three-dimensional objects in a layerwise manner by forming a plurality of layers in a configured pattern corresponding to the shape of the objects, as described herein.

The method is generally effected by sequentially forming a plurality of layers in a configured pattern corresponding to the shape of the object, such that formation of each of at least a few of said layers, or of each of said layers, comprises dispensing a building material (uncured) which comprises one or more modeling material formulation(s) as described herein, and exposing the dispensed modeling material to a curing condition (e.g., curing energy) to thereby form a cured modeling material, as described in further detail hereinafter.

In some exemplary embodiments of the invention an object is manufactured by dispensing a building material (uncured) that comprises two or more different modeling material formulations, each modeling material formulation from a different dispensing head and/or a different array of nozzles of an inkjet printing apparatus. The modeling material formulations are optionally and preferably deposited in layers during the same pass of the printing heads. The modeling material formulations and/or combination of formulations within the layer are selected according to the desired properties of the object, and as further described in detail hereinbelow.

The final three-dimensional object is made of the modeling material or a combination of modeling materials or a combination of modeling material/s and support material/s or modification thereof (e.g., following curing). All these operations are well-known to those skilled in the art of solid freeform fabrication.

Herein throughout, the term "object" describes a final product of the additive manufacturing. This term refers to the product obtained by a method as described herein, after removal of the support material, if such has been used as part of the building material, and subjecting the printed object to post-curing. The "object" therefore essentially consists (at least 95 weight percents) of a hardened (e.g., cured) modeling material.

The term "object" as used herein throughout refers to a whole object or a part thereof.

The term "printed object" refers to the plurality of dispensed layers formed during an additive manufacturing process. The printed object can be identical to the object in case no support material is used and no post-treatment is effected.

Herein throughout, the phrases "building material formulation", "uncured building material", "uncured building material formulation", "building material" and other variations therefore, collectively describe the materials that are dispensed to sequentially form the layers, as described herein. This phrase encompasses uncured materials dispensed so as to form the object, namely, one or more uncured modeling material formulation(s), and uncured materials dispensed so as to form the support, namely uncured support material formulations.

The building material formulation is typically a curable formulation, which is capable of being hardened upon exposure to a suitable curing condition, and which comprises one or more curable materials, optionally in combination with one or more agents for promoting curing (also referred to as initiators). Curable formulations may optionally further comprise non-curable materials, which do not undergo a chemical change when exposed to a curing condition.

According to some embodiments, the modeling material formulation and optionally also the support material formulation are curable formulations, which harden upon being dispensed, that is, a viscosity of a curable formulation changes after it is dispensed, typically upon exposure to a curing condition such as irradiation, as described herein.

The formulations forming the building material (modeling material formulations and support material formulations) are curable formulations, or formulations that comprise a curable system, and comprise one or more curable materials, which, when exposed to a curing condition (e.g., curing energy), form hardened (cured) material. Typically, a curable system or formulation further comprises one or more agents for promoting hardening of the formulation, for example, one or more agents for promoting polymerization of polymerizable materials.

A curable formulation or system according to the present embodiments is such that hardens, typically upon exposure to a suitable condition (e.g., irradiation or heat), within less than 1 minute, preferably less than 30 seconds, more preferably less than 20 seconds, for example, within a time period that ranges from few milliseconds to 30 seconds, including any intermediate values and subranges therebetween.

A curable formulation or system usable in additive manufacturing such as three-dimensional inkjet printing is such that a thin layer of the formulation (e.g., of less than 50 microns, for example, of 5-40 microns) hardens to a hardening degree of at least 80% when exposed to irradiation, within less than 1 second (e.g., within 100 milliseconds to 1 second).

By "hardening degree" or "degree of hardening" it is meant herein the extent at which hardening is effected, that is, the extent at which curable materials or system as described herein harden, for example, undergo polymerization and/or cross-linking. When a curable material is a polymerizable material, this phrase encompasses both a mol % of the curable materials in a formulation that underwent polymerization and/or cross-linking, upon exposure to a curing condition; and/or the degree at which polymerization and/or cross-linking was effected, for example, the degree of chain elongation and/or cross-linking. Determining a degree of polymerization can be performed by methods known to those skilled in the art.

Herein throughout, the phrase "cured modeling material" or "hardened modeling material" describes the part of the building material that forms the object, as defined herein, upon exposing the dispensed building material to curing, and, optionally, if a support material has been dispensed, also upon removal of the cured support material, as described herein. The cured modeling material can be a single cured material or a mixture of two or more cured materials, depending on the modeling material formulations used in the method, as described herein.

The phrase "cured modeling material" or "cured modeling material formulation" can be regarded as a cured building material wherein the building material consists only of a modeling material formulation (and not of a support material formulation). That is, this phrase refers to the portion of the building material, which is used to provide the final object.

Herein throughout, the phrase "modeling material formulation", which is also referred to herein interchangeably as "modeling formulation", "model formulation" "model material formulation" or simply as "formulation", describes a part or all of the building material which is dispensed so as to form the object, as described herein. The modeling material formulation is an uncured modeling formulation (unless specifically indicated otherwise), which, upon exposure to curing condition, forms the object or a part thereof.

In some embodiments of the present invention, a modeling material formulation is formulated for use in three-dimensional inkjet printing and is able to form a three-dimensional object on its own, i.e., without having to be mixed or combined with any other substance.

In some embodiments of the present invention, a modeling material formulation is formulated for use in three-dimensional inkjet printing, and meets the requirements of a 3D inkjet printing system and process, that is, it features viscosity, surface tension, jettability and reactivity (hardening time) suitable for such system and process.

An uncured building material can comprise one or more modeling material formulations, and can be dispensed such that different parts of the object are made, upon curing, of different cured modeling formulations or different combinations thereof, and hence are made of different cured modeling materials or different mixtures of cured modeling materials.

The phrase "digital materials", abbreviated as "DM", as used herein and in the art, describes a combination of two or more materials on a microscopic scale or voxel level such that the printed zones of a specific material are at the level of few voxels, or at a level of a voxel block. Such digital materials may exhibit new properties that are affected by the selection of types of materials and/or the ratio and relative spatial distribution of two or more materials.

In exemplary digital materials, the modeling material of each voxel or voxel block, obtained upon curing, is independent of the modeling material of a neighboring voxel or voxel block, obtained upon curing, such that each voxel or voxel block may result in a different model material and the new properties of the whole part are a result of a spatial combination, on the voxel level, of several different model materials.

As used herein, a "voxel" of a layer refers to a physical three-dimensional elementary volume within the layer that corresponds to a single pixel of a bitmap describing the layer. The size of a voxel is approximately the size of a region that is formed by a building material, once the building material is dispensed at a location corresponding to the respective pixel, straightened, and solidified.

Herein throughout, whenever the expression "at the voxel level" is used in the context of a different material and/or properties, it is meant to include differences between voxel blocks, as well as differences between voxels or groups of few voxels. In preferred embodiments, the properties of the whole part are a result of a spatial combination, on the voxel block level, of several different model materials.

Herein, a "modeling material formulation system" describes one or more modeling material formulations that are used to form the three-dimensional object. The one or more formulations in a formulation system can be used in a single jetting mode, when typically a single modeling material formulation is used, in a multi-jetting mode, such as PolyJet, or in a multi-material mode, including DM mode, when two or more modeling material formulations are combined, and in the provision of shelled objects, where two or more formulations, each featuring certain properties, as previously described, are used for forming a core-shell structure, as is further discussed hereinafter.

The formulations forming the building material (modeling material formulations and support material formulations) comprise one or more curable materials, which, when exposed to a curing condition, form hardened (cured) material.

Herein throughout, a "curable material" is a compound (typically a monomeric or oligomeric compound, yet optionally a polymeric material) which, when exposed to a curing condition, solidifies or hardens to form a cured material. Curable materials are typically polymerizable materials, which undergo polymerization and/or cross-linking when exposed to a suitable curing condition (e.g., a suitable energy source).

A curable material, according to the present embodiments, also encompasses materials which harden or solidify (cure) without being exposed to a curing energy, but rather to a curing condition (for example, upon exposure to a chemical reagent), or simply upon exposure to the environment.

The terms "curable" and "solidifiable" as used herein are interchangeable.

The polymerization can be, for example, free-radical polymerization, cationic polymerization or anionic polymerization, and each can be induced when exposed to curing energy such as, for example, radiation, heat, etc., as described herein.

In some of any of the embodiments described herein, a curable material is a photopolymerizable material, which polymerizes and/or undergoes cross-linking upon exposure to radiation, as described herein, and in some embodiments the curable material is a UV-curable material, which polymerizes and/or undergoes cross-linking upon exposure to UV radiation, as described herein.

In some embodiments, a curable material as described herein is a photopolymerizable material that polymerizes via photo-induced free-radical polymerization. Alternatively, the curable material is a photopolymerizable material that polymerizes via photo-induced cationic polymerization.

In some of any of the embodiments described herein, a curable material can be a monomer, an oligomer or a (e.g., short-chain) polymer, each being polymerizable and/or cross-linkable as described herein.

In some of any of the embodiments described herein, when a curable material is exposed to a curing condition (e.g., radiation), it hardens (undergoes curing) by any one, or combination, of chain elongation and cross-linking.

In some of any of the embodiments described herein, a curable material is a monomer or a mixture of monomers which can form a polymeric material upon a polymerization reaction, when exposed to a curing condition (e.g., curing energy) at which the polymerization reaction occurs. Such curable materials are also referred to herein as monomeric curable materials.

Herein and in the art, the term "monomer" or "monomeric" describes a material that is devoid of repeating backbone units that are linked to one another.

In some of any of the embodiments described herein, a curable material is an oligomer or a mixture of oligomers which can form a polymeric material upon a polymerization reaction, when exposed to a curing condition (e.g., curing energy) at which the polymerization reaction occurs. Such curable materials are also referred to herein as oligomeric curable materials.

Herein and in the art, the term "oligomer" or "oligomeric" describes a material that comprises repeating backbone units that are linked to one another, wherein the number of such repeating units is from 2 to 10.

In some of any of the embodiments described herein, a curable material is a polymer or a mixture of polymers which can form a higher and/or cross-linked polymeric material upon a polymerization reaction, when exposed to a curing condition (e.g., curing energy) at which the polymerization reaction occurs. Such curable materials are also referred to herein as polymeric curable materials.

Herein and in the art, the term "polymer" or "polymeric" describes a material that comprises repeating backbone units that are linked to one another, wherein the number of such repeating units is higher than 10. A "polymer" or "polymeric material" can also be defined as such that when a few backbone units are removed from the material, its propertied do not change significantly.

In some of any of the embodiments described herein, a curable material, whether monomeric or oligomeric or polymeric, can be a mono-functional curable material or a multi-functional curable material.

Herein, a mono-functional curable material comprises one functional group that can undergo polymerization when exposed to a curing condition (e.g., curing energy such as radiation).

A multi-functional curable material comprises two or more, e.g., 2, 3, 4 or more, functional groups that can undergo polymerization when exposed to a curing condition (e.g., curing energy). Multi-functional curable materials can be, for example, di-functional, tri-functional or tetra-functional curable materials, which comprise 2, 3 or 4 groups that can undergo polymerization, respectively. The two or more functional groups in a multi-functional curable material are typically linked to one another by a linking moiety, as defined herein. When the linking moiety is an oligomeric or polymeric moiety, the multi-functional group is an oligomeric or polymeric multi-functional curable material. Multi-functional curable materials can undergo polymerization when subjected to a curing condition (e.g., curing energy) and/or act as cross-linkers.

System and Method:

The method and system of the present embodiments manufacture three-dimensional objects based on computer object data in a layerwise manner by forming a plurality of layers in a configured pattern corresponding to the shape of the objects. The computer object data can be in any known format, including, without limitation, a Standard Tessellation Language (STL) or a StereoLithography Contour (SLC) format, an OBJ File format (OBJ), a 3D Manufacturing Format (3MF), Virtual Reality Modeling Language (VRML), Additive Manufacturing File (AMF) format, Drawing Exchange Format (DXF), Polygon File Format (PLY) or any other format suitable for Computer-Aided Design (CAD).

Each layer is formed by an additive manufacturing apparatus which scans a two-dimensional surface and patterns it. While scanning, the apparatus visits a plurality of target locations on the two-dimensional layer or surface, and decides, for each target location or a group of target locations, whether or not the target location or group of target locations is to be occupied by building material formulation, and which type of building material formulation is to be delivered thereto. The decision is made according to a computer image of the surface.

In preferred embodiments of the present invention the AM comprises three-dimensional printing, more preferably three-dimensional inkjet printing. In these embodiments a building material formulation is dispensed from a printing head having one or more arrays of nozzles to deposit building material formulation in layers on a supporting structure. The AM apparatus thus dispenses building material formulation in target locations which are to be occupied and leaves other target locations void. The apparatus typically includes a plurality of arrays of nozzles, each of which can be configured to dispense a different building material formulation. Thus, different target locations can be occupied by different building material formulations. The types of building material formulations can be categorized into two major categories: modeling material formulation and support material formulation. The support material formulation serves as a supporting matrix or construction for supporting the object or object parts during the fabrication process and/or other purposes, e.g., providing hollow or porous objects. Support constructions may additionally include modeling material formulation elements, e.g. for further support strength.

The modeling material formulation is generally a composition which is formulated for use in additive manufacturing and which is able to form a three-dimensional object on its own, i.e., without having to be mixed or combined with any other substance.

The final three-dimensional object is made of the modeling material formulation or a combination of modeling material formulations or modeling and support material formulations or modification thereof (e.g., following curing). All these operations are well-known to those skilled in the art of solid freeform fabrication.

In some exemplary embodiments of the invention an object is manufactured by dispensing two or more different modeling material formulations, each material formulation from a different array of nozzles (belonging to the same or different printing heads) of the AM apparatus. In some embodiments, two or more such arrays of nozzles that dispense different modeling material formulations are both located in the same printing head of the AM apparatus. In some embodiments, arrays of nozzles that dispense different modeling material formulations are located in separate printing heads, for example, a first array of nozzles dispensing a first modeling material formulation is located in a first printing head, and a second array of nozzles dispensing a second modeling material formulation is located in a second printing head.

In some embodiments, an array of nozzles that dispense a modeling material formulation and an array of nozzles that dispense a support material formulation are both located in the same printing head. In some embodiments, an array of nozzles that dispense a modeling material formulation and an array of nozzles that dispense a support material formulation are both located in separate the same printing head.

Figure 2A:
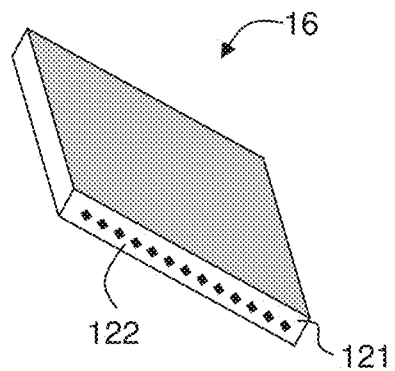
FIGS. 2A, 2B and 2C are schematic illustrations of printing heads according to some embodiments of the present invention.
Figure 2B:
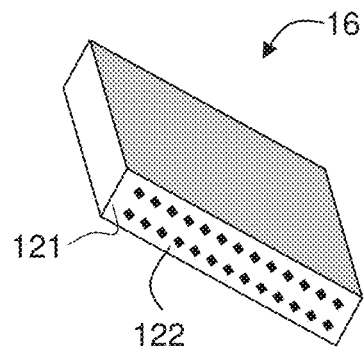
Figure 2C:
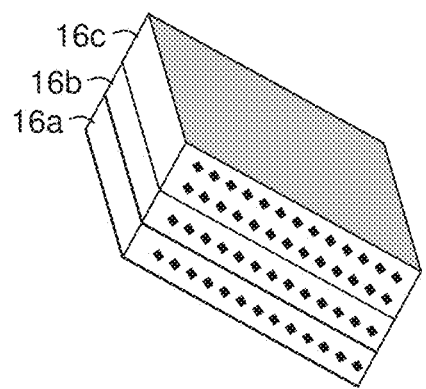

A representative and non-limiting example of a system 110 suitable for AM of an object 112 according to some embodiments of the present invention is illustrated in FIG. 1A. System 110 comprises an additive manufacturing apparatus 114 having a dispensing unit 16 which comprises a plurality of printing heads. Each head preferably comprises one or more arrays of nozzles 122, typically mounted on an orifice plate 121, as illustrated in FIGS. 2A-C described below, through which a liquid building material formulation 124 is dispensed.

Preferably, but not obligatorily, apparatus 114 is a three-dimensional printing apparatus, in which case the printing heads are printing heads, and the building material formulation is dispensed via inkjet technology. This need not necessarily be the case, since, for some applications, it may not be necessary for the additive manufacturing apparatus to employ three-dimensional printing techniques. Representative examples of additive manufacturing apparatus contemplated according to various exemplary embodiments of the present invention include, without limitation, fused deposition modeling apparatus and fused material formulation deposition apparatus.

The term "printing head" as used herein represents a dispensing head usable in 3D printing such as 3D inkjet printing.

The term "dispensing head" encompasses the term "printing head" in the context of embodiments relating to 3D inkjet printing.

Each dispensing head is optionally and preferably fed via one or more building material formulation reservoirs which may optionally include a temperature control unit (e.g., a temperature sensor and/or a heating device), and a material formulation level sensor. To dispense a building material formulation, a voltage signal is applied to the dispensing heads to selectively deposit droplets of a selected formulation or a selected combination of two or more formulations via the dispensing head nozzles, for example, as in piezoelectric inkjet printing technology. Another example includes thermal inkjet printing heads. In these types of heads, there are heater elements in thermal contact with the building material formulation, for heating the building material formulation to form gas bubbles therein, upon activation of the heater elements by a voltage signal. The gas bubbles generate pressures in the building material formulation, causing droplets of building material formulation to be ejected through the nozzles. Piezoelectric and thermal printing heads are known to those skilled in the art of solid freeform fabrication. For any types of inkjet dispensing heads, the dispensing rate of the head depends on the number of nozzles, the type of nozzles and the applied voltage signal rate (frequency). Preferably, but not obligatorily, the overall number of dispensing nozzles or nozzle arrays is selected such that half of the dispensing nozzles are designated to dispense support material formulation and half of the dispensing nozzles are designated to dispense modeling material formulation, i.e. the number of nozzles jetting modeling material formulations is the same as the number of nozzles jetting support material formulation. In the representative example of FIG. 1A, four printing heads 16a, 16b, 16c and 16d are illustrated. Each of heads 16a, 16b, 16c and 16d has a nozzle array. In this Example, heads 16a and 16b can be designated for modeling material formulation/s and heads 16c and 16d can be designated for support material formulation. Thus, head 16a can dispense one modeling material formulation, head 16b can dispense another modeling material formulation and heads 16c and 16d can both dispense support material formulation. In an alternative embodiment, heads 16c and 16d, for example, may be combined in a single head having two nozzle arrays for depositing support material formulation. In a further alternative embodiment any one or more of the printing heads may have more than one nozzle arrays for depositing more than one material formulation, e.g. two nozzle arrays for depositing two different modeling material formulations or a modeling material formulation and a support material formulation, each formulation via a different array or number of nozzles.

Yet it is to be understood that it is not intended to limit the scope of the present invention and that the number of modeling material formulation printing heads (modeling heads) and the number of support material formulation printing heads (support heads) may differ. Generally, the number of arrays of nozzles that dispense modeling material formulation, the number of arrays of nozzles that dispense support material formulation, and the number of nozzles in each respective array are selected such as to provide a predetermined ratio, a, between the maximal dispensing rate of the support material formulation and the maximal dispensing rate of modeling material formulation. The value of the predetermined ratio, a, is preferably selected to ensure that in each formed layer, the height of modeling material formulation equals the height of support material formulation. Typical values for a are from about 0.6 to about 1.5.

For example, for a=1, the overall dispensing rate of support material formulation is generally the same as the overall dispensing rate of the modeling material formulation when all the arrays of nozzles operate.

Apparatus 114 can comprise, for example, M modeling heads each having m arrays of p nozzles, and S support heads each having s arrays of q nozzles such that M×m×p=s×s×q. Each of the M×m modeling arrays and s×s support arrays can be manufactured as a separate physical unit, which can be assembled and disassembled from the group of arrays. In this embodiment, each such array optionally and preferably comprises a temperature control unit and a material formulation level sensor of its own, and receives an individually controlled voltage for its operation.

Apparatus 114 can further comprise a solidifying device 324 which can include any device configured to emit light, heat or the like that may cause the deposited material formulation to harden. For example, solidifying device 324 can comprise one or more radiation sources, which can be, for example, an ultraviolet or visible or infrared lamp, or other sources of electromagnetic radiation, or electron beam source, depending on the modeling material formulation being used. In some embodiments of the present invention, solidifying device 324 serves for curing or solidifying the modeling material formulation.

In addition to solidifying device 324, apparatus 114 optionally and preferably comprises an additional radiation source 328 for solvent evaporation. Radiation source 328 optionally and preferably generates infrared radiation. In various exemplary embodiments of the invention solidifying device 324 comprises a radiation source generating ultraviolet radiation, and radiation source 328 generates infrared radiation.

In some embodiments of the present invention apparatus 114 comprises cooling system 134 such as one or more fans or the like The printing head(s) and radiation source are preferably mounted in a frame or block 128 which is preferably operative to reciprocally move over a tray 360, which serves as the working surface. In some embodiments of the present invention the radiation sources are mounted in the block such that they follow in the wake of the printing heads to at least partially cure or solidify the material formulations just dispensed by the printing heads. Tray 360 is positioned horizontally. According to the common conventions an X-Y-Z Cartesian coordinate system is selected such that the X-Y plane is parallel to tray 360. Tray 360 is preferably configured to move vertically (along the Z direction), typically downward. In various exemplary embodiments of the invention, apparatus 114 further comprises one or more leveling devices 132, e.g. a roller 326. Leveling device 326 serves to straighten, level and/or establish a thickness of the newly formed layer prior to the formation of the successive layer thereon. Leveling device 326 preferably comprises a waste collection device 136 for collecting the excess material formulation generated during leveling. Waste collection device 136 may comprise any mechanism that delivers the material formulation to a waste tank or waste cartridge.

In use, the printing heads of unit 16 move in a scanning direction, which is referred to herein as the X direction, and selectively dispense building material formulation in a predetermined configuration in the course of their passage over tray 360. The building material formulation typically comprises one or more types of support material formulation and one or more types of modeling material formulation. The passage of the printing heads of unit 16 is followed by the curing of the modeling material formulation(s) by radiation source 126. In the reverse passage of the heads, back to their starting point for the layer just deposited, an additional dispensing of building material formulation may be carried out, according to predetermined configuration. In the forward and/or reverse passages of the printing heads, the layer thus formed may be straightened by leveling device 326, which preferably follows the path of the printing heads in their forward and/or reverse movement. Once the printing heads return to their starting point along the X direction, they may move to another position along an indexing direction, referred to herein as the Y direction, and continue to build the same layer by reciprocal movement along the X direction. Alternately, the printing heads may move in the Y direction between forward and reverse movements or after more than one forward-reverse movement. The series of scans performed by the printing heads to complete a single layer is referred to herein as a single scan cycle.

Once the layer is completed, tray 360 is lowered in the Z direction to a predetermined Z level, according to the desired thickness of the layer subsequently to be printed. The procedure is repeated to form three-dimensional object 112 in a layerwise manner.

In another embodiment, tray 360 may be displaced in the Z direction between forward and reverse passages of the printing head of unit 16, within the layer. Such Z displacement is carried out in order to cause contact of the leveling device with the surface in one direction and prevent contact in the other direction.

System 110 optionally and preferably comprises a building material formulation supply system 330 which comprises the building material formulation containers or cartridges and supplies a plurality of building material formulations to fabrication apparatus 114.

A control unit 152 controls fabrication apparatus 114 and optionally and preferably also supply system 330. Control unit 152 typically includes an electronic circuit configured to perform the controlling operations. Control unit 152 preferably communicates with a data processor 154 which transmits digital data pertaining to fabrication instructions based on computer object data, e.g., a CAD configuration represented on a computer readable medium in a form of a Standard Tessellation Language (STL) format or the like. Typically, control unit 152 controls the voltage applied to each printing head or each nozzle array and the temperature of the building material formulation in the respective printing head or respective nozzle array.

Once the manufacturing data is loaded to control unit 152 it can operate without user intervention. In some embodiments, control unit 152 receives additional input from the operator, e.g., using data processor 154 or using a user interface 116 communicating with unit 152. User interface 116 can be of any type known in the art, such as, but not limited to, a keyboard, a touch screen and the like. For example, control unit 152 can receive, as additional input, one or more building material formulation types and/or attributes, such as, but not limited to, color, characteristic distortion and/or transition temperature, viscosity, electrical property, magnetic property. Other attributes and groups of attributes are also contemplated.

Figure 1B:
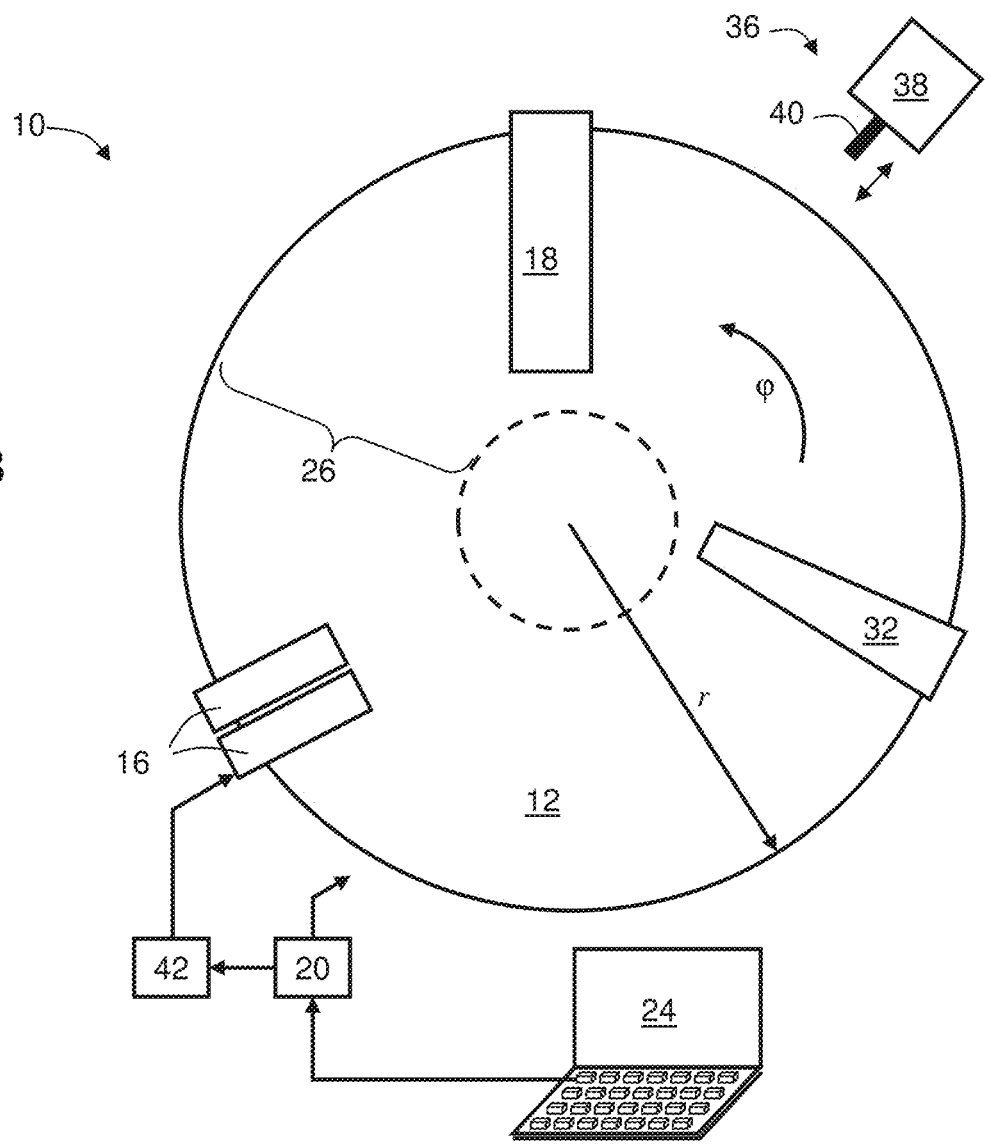
Figure 1C:
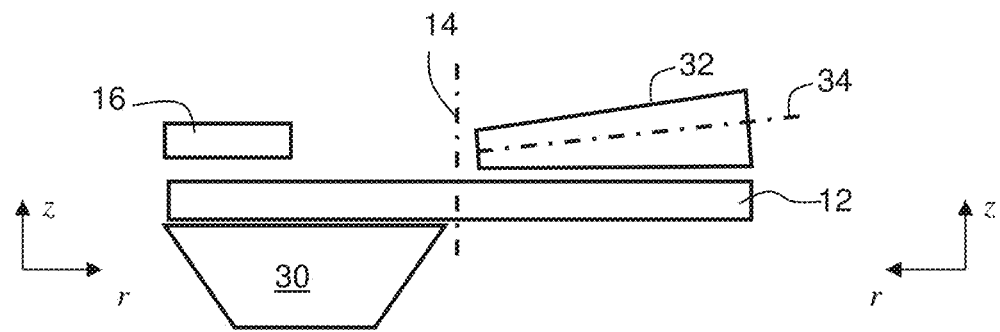
Figure 1D:
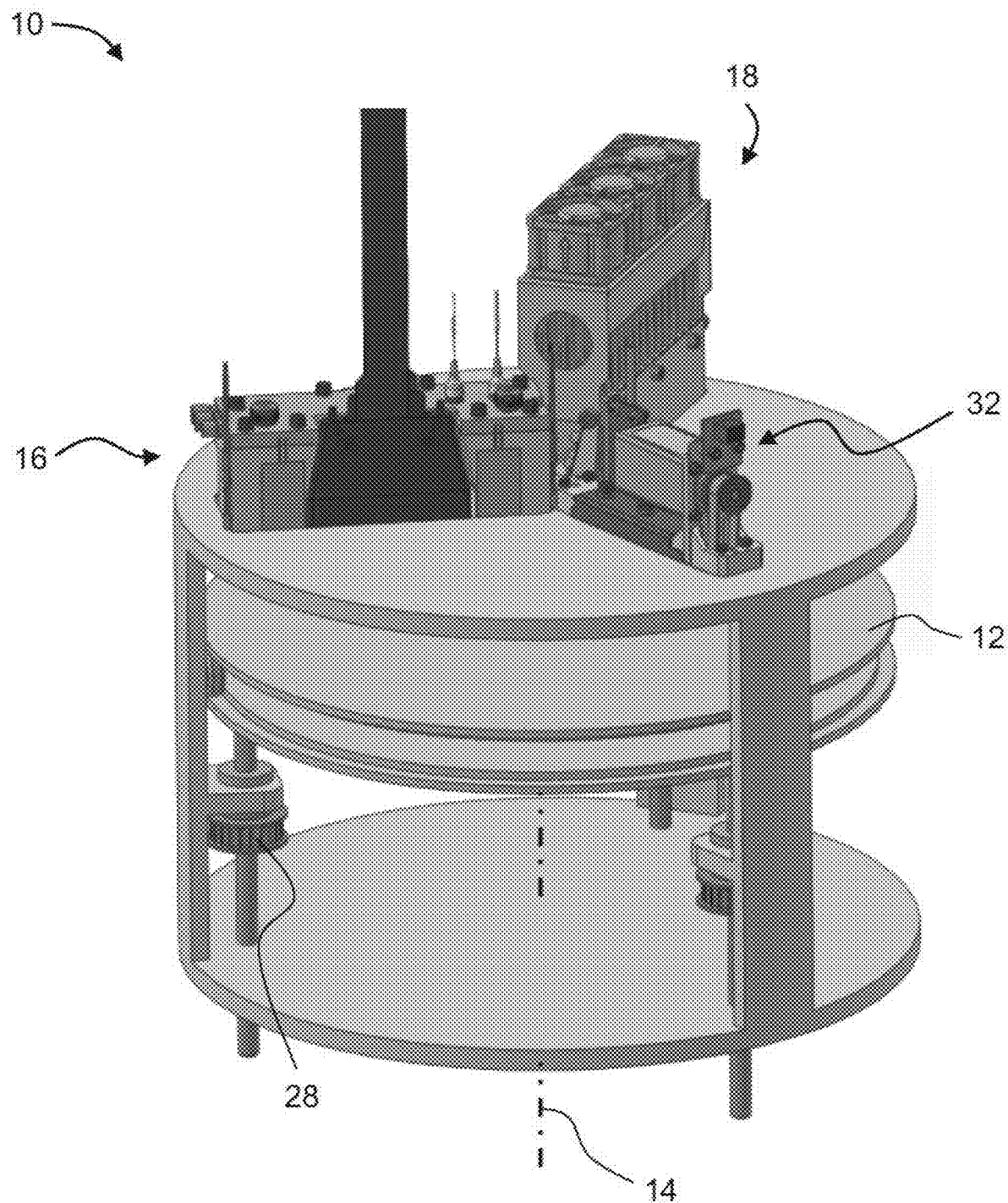

Another representative and non-limiting example of a system 10 suitable for AM of an object according to some embodiments of the present invention is illustrated in FIGS. 1B-D. FIGS. 1B-D illustrate a top view (FIG. 1B), a side view (FIG. 1C) and an isometric view (FIG. 1D) of system 10.

In the present embodiments, system 10 comprises a tray 12 and a plurality of inkjet printing heads 16, each having one or more arrays of nozzles with respective one or more pluralities of separated nozzles. Tray 12 can have a shape of a disk or it can be annular. Non-round shapes are also contemplated, provided they can be rotated about a vertical axis.

Tray 12 and heads 16 are optionally and preferably mounted such as to allow a relative rotary motion between tray 12 and heads 16. This can be achieved by (i) configuring tray 12 to rotate about a vertical axis 14 relative to heads 16, (ii) configuring heads 16 to rotate about vertical axis 14 relative to tray 12, or (iii) configuring both tray 12 and heads 16 to rotate about vertical axis 14 but at different rotation velocities (e.g., rotation at opposite direction). While some embodiments of system 10 are described below with a particular emphasis to configuration (i) wherein the tray is a rotary tray that is configured to rotate about vertical axis 14 relative to heads 16, it is to be understood that the present application contemplates also configurations (ii) and (iii) for system 10. Any one of the embodiments of system 10 described herein can be adjusted to be applicable to any of configurations (ii) and (iii), and one of ordinary skills in the art, provided with the details described herein, would know how to make such adjustment.

In the following description, a direction parallel to tray 12 and pointing outwardly from axis 14 is referred to as the radial direction r, a direction parallel to tray 12 and perpendicular to the radial direction r is referred to herein as the azimuthal direction φ, and a direction perpendicular to tray 12 is referred to herein is the vertical direction z.

The term "radial position," as used herein, refers to a position on or above tray 12 at a specific distance from axis 14. When the term is used in connection to a printing head, the term refers to a position of the head which is at specific distance from axis 14. When the term is used in connection to a point on tray 12, the term corresponds to any point that belongs to a locus of points that is a circle whose radius is the specific distance from axis 14 and whose center is at axis 14.

The term "azimuthal position," as used herein, refers to a position on or above tray 12 at a specific azimuthal angle relative to a predetermined reference point. Thus, radial position refers to any point that belongs to a locus of points that is a straight line forming the specific azimuthal angle relative to the reference point.

The term "vertical position," as used herein, refers to a position over a plane that intersect the vertical axis 14 at a specific point.

Tray 12 serves as a building platform for three-dimensional printing. The working area on which one or objects are printed is typically, but not necessarily, smaller than the total area of tray 12. In some embodiments of the present invention the working area is annular. The working area is shown at 26. In some embodiments of the present invention tray 12 rotates continuously in the same direction throughout the formation of object, and in some embodiments of the present invention tray reverses the direction of rotation at least once (e.g., in an oscillatory manner) during the formation of the object. Tray 12 is optionally and preferably removable. Removing tray 12 can be for maintenance of system 10, or, if desired, for replacing the tray before printing a new object. In some embodiments of the present invention system 10 is provided with one or more different replacement trays (e.g., a kit of replacement trays), wherein two or more trays are designated for different types of objects (e.g., different weights) different operation modes (e.g., different rotation speeds), etc. The replacement of tray 12 can be manual or automatic, as desired. When automatic replacement is employed, system 10 comprises a tray replacement device 36 configured for removing tray 12 from its position below heads 16 and replacing it by a replacement tray (not shown). In the representative illustration of FIG. 1B tray replacement device 36 is illustrated as a drive 38 with a movable arm 40 configured to pull tray 12, but other types of tray replacement devices are also contemplated.

Exemplified embodiments for the printing head 16 are illustrated in FIGS. 2A-2C. These embodiments can be employed for any of the AM systems described above, including, without limitation, system 110 and system 10.

FIGS. 2A-B illustrate a printing head 16 with one (FIG. 2A) and two (FIG. 2B) nozzle arrays 22. The nozzles in the array are preferably aligned linearly, along a straight line. In embodiments in which a particular printing head has two or more linear nozzle arrays, the nozzle arrays are optionally and preferably can be parallel to each other. When a printing head has two or more arrays of nozzles (e.g., FIG. 2B) all arrays of the head can be fed with the same building material formulation, or at least two arrays of the same head can be fed with different building material formulations.

When a system similar to system 110 is employed, all printing heads 16 are optionally and preferably oriented along the indexing direction with their positions along the scanning direction being offset to one another.

When a system similar to system 10 is employed, all printing heads 16 are optionally and preferably oriented radially (parallel to the radial direction) with their azimuthal positions being offset to one another. Thus, in these embodiments, the nozzle arrays of different printing heads are not parallel to each other but are rather at an angle to each other, which angle being approximately equal to the azimuthal offset between the respective heads. For example, one head can be oriented radially and positioned at azimuthal position (pi, and another head can be oriented radially and positioned at azimuthal position $\varphi_2$. In this example, the azimuthal offset between the two heads is $\varphi_1$-$\varphi_2$, and the angle between the linear nozzle arrays of the two heads is also $\varphi_1$-$\varphi_2$.

In some embodiments, two or more printing heads can be assembled to a block of printing heads, in which case the printing heads of the block are typically parallel to each other. A block including several inkjet printing heads 16a, 16b, 16c is illustrated in FIG. 2C.

In some embodiments, system 10 comprises a stabilizing structure 30 positioned below heads 16 such that tray 12 is between stabilizing structure 30 and heads 16. Stabilizing structure 30 may serve for preventing or reducing vibrations of tray 12 that may occur while inkjet printing heads 16 operate. In configurations in which printing heads 16 rotate about axis 14, stabilizing structure 30 preferably also rotates such that stabilizing structure 30 is always directly below heads 16 (with tray 12 between heads 16 and tray 12).

Tray 12 and/or printing heads 16 is optionally and preferably configured to move along the vertical direction z, parallel to vertical axis 14 so as to vary the vertical distance between tray 12 and printing heads 16. In configurations in which the vertical distance is varied by moving tray 12 along the vertical direction, stabilizing structure 30 preferably also moves vertically together with tray 12. In configurations in which the vertical distance is varied by heads 16 along the vertical direction, while maintaining the vertical position of tray 12 fixed, stabilizing structure 30 is also maintained at a fixed vertical position.

The vertical motion can be established by a vertical drive 28. Once a layer is completed, the vertical distance between tray 12 and heads 16 can be increased (e.g., tray 12 is lowered relative to heads 16) by a predetermined vertical step, according to the desired thickness of the layer subsequently to be printed. The procedure is repeated to form a three-dimensional object in a layerwise manner.

The operation of inkjet printing heads 16 and optionally and preferably also of one or more other components of system 10, e.g., the motion of tray 12, are controlled by a controller 20. The controller can have an electronic circuit and a non-volatile memory medium readable by the circuit, wherein the memory medium stores program instructions which, when read by the circuit, cause the circuit to perform control operations as further detailed below.

Controller 20 can also communicate with a host computer 24 which transmits digital data pertaining to fabrication instructions based on computer object data, e.g., in a form of a Standard Tessellation Language (STL) or a StereoLithography Contour (SLC) format, Virtual Reality Modeling Language (VRML), Additive Manufacturing File (AMF) format, Drawing Exchange Format (DXF), Polygon File Format (PLY) or any other format suitable for Computer-Aided Design (CAD). The object data formats are typically structured according to a Cartesian system of coordinates. In these cases, computer 24 preferably executes a procedure for transforming the coordinates of each slice in the computer object data from a Cartesian system of coordinates into a polar system of coordinates. Computer 24 optionally and preferably transmits the fabrication instructions in terms of the transformed system of coordinates. Alternatively, computer 24 can transmit the fabrication instructions in terms of the original system of coordinates as provided by the computer object data, in which case the transformation of coordinates is executed by the circuit of controller 20.

Figure 3A:
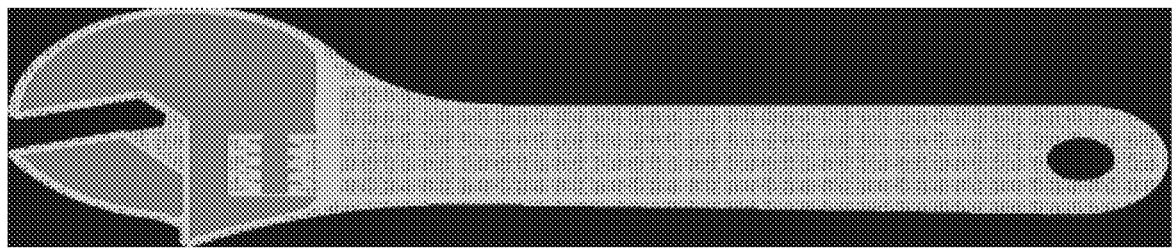
FIGS. 3A and 3B are schematic illustrations demonstrating coordinate transformations according to some embodiments of the present invention.
Figure 3B:
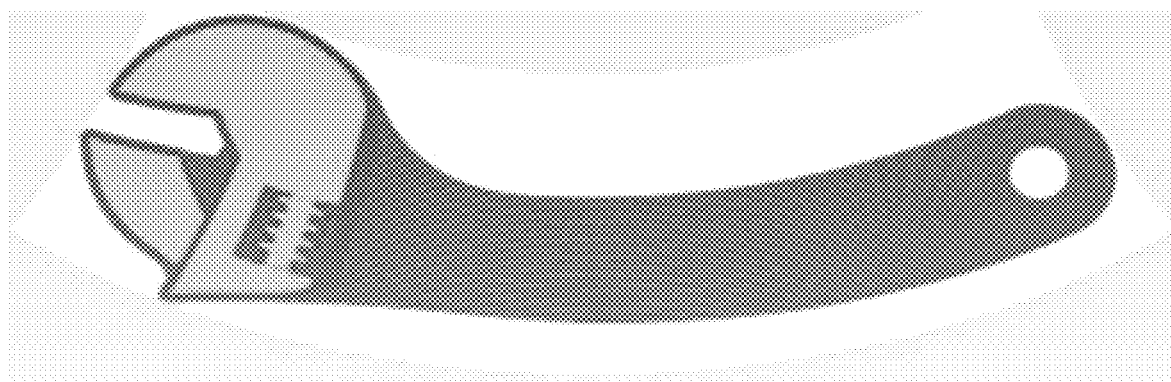

The transformation of coordinates allows three-dimensional printing over a rotating tray. In non-rotary systems with a stationary tray with the printing heads typically reciprocally move above the stationary tray along straight lines. In such systems, the printing resolution is the same at any point over the tray, provided the dispensing rates of the heads are uniform. In system 10, unlike non-rotary systems, not all the nozzles of the head points cover the same distance over tray 12 during at the same time. The transformation of coordinates is optionally and preferably executed so as to ensure equal amounts of excess material formulation at different radial positions. Representative examples of coordinate transformations according to some embodiments of the present invention are provided in FIGS. 3A-B, showing three slices of an object (each slice corresponds to fabrication instructions of a different layer of the objects), where FIG. 3A illustrates a slice in a Cartesian system of coordinates and FIG. 3B illustrates the same slice following an application of a transformation of coordinates procedure to the respective slice.

Typically, controller 20 controls the voltage applied to the respective component of the system 10 based on the fabrication instructions and based on the stored program instructions as described below.

Generally, controller 20 controls printing heads 16 to dispense, during the rotation of tray 12, droplets of building material formulation in layers, such as to print a three-dimensional object on tray 12.

System 10 optionally and preferably comprises one or more radiation sources 18, which can be, for example, an ultraviolet or visible or infrared lamp, or other sources of electromagnetic radiation, or electron beam source, depending on the modeling material formulation being used. Radiation source can include any type of radiation emitting device, including, without limitation, light emitting diode (LED), digital light processing (DLP) system, resistive lamp and the like. Radiation source 18 serves for curing or solidifying the modeling material formulation. In various exemplary embodiments of the invention the operation of radiation source 18 is controlled by controller 20 which may activate and deactivate radiation source 18 and may optionally also control the amount of radiation generated by radiation source 18.

In some embodiments of the invention, system 10 further comprises one or more leveling devices 32 which can be manufactured as a roller or a blade. Leveling device 32 serves to straighten the newly formed layer prior to the formation of the successive layer thereon. In some embodiments, leveling device 32 has the shape of a conical roller positioned such that its symmetry axis 34 is tilted relative to the surface of tray 12 and its surface is parallel to the surface of the tray. This embodiment is illustrated in the side view of system 10 (FIG. 1C).

The conical roller can have the shape of a cone or a conical frustum.

The opening angle of the conical roller is preferably selected such that there is a constant ratio between the radius of the cone at any location along its axis 34 and the distance between that location and axis 14. This embodiment allows roller 32 to efficiently level the layers, since while the roller rotates, any point p on the surface of the roller has a linear velocity which is proportional (e.g., the same) to the linear velocity of the tray at a point vertically beneath point p. In some embodiments, the roller has a shape of a conical frustum having a height h, a radius $R_1$ at its closest distance from axis 14, and a radius $R_2$ at its farthest distance from axis 14, wherein the parameters h, $R_1$ and $R_2$ satisfy the relation $R_1/R_2=(R-h)/h$ and wherein R is the farthest distance of the roller from axis 14 (for example, R can be the radius of tray 12).

The operation of leveling device 32 is optionally and preferably controlled by controller 20 which may activate and deactivate leveling device 32 and may optionally also control its position along a vertical direction (parallel to axis 14) and/or a radial direction (parallel to tray 12 and pointing toward or away from axis 14.

In some embodiments of the present invention printing heads 16 are configured to reciprocally move relative to tray along the radial direction r. These embodiments are useful when the lengths of the nozzle arrays 22 of heads 16 are shorter than the width along the radial direction of the working area 26 on tray 12. The motion of heads 16 along the radial direction is optionally and preferably controlled by controller 20.

Some embodiments contemplate the fabrication of an object by dispensing different material formulations from different arrays of nozzles (belonging to the same or different printing head). These embodiments provide, inter alia, the ability to select material formulations from a given number of material formulations and define desired combinations of the selected material formulations and their properties. According to the present embodiments, the spatial locations of the deposition of each material formulation with the layer is defined, either to effect occupation of different three-dimensional spatial locations by different material formulations, or to effect occupation of substantially the same three-dimensional location or adjacent three-dimensional locations by two or more different material formulations so as to allow post deposition spatial combination of the material formulations within the layer, thereby to form a composite material formulation at the respective location or locations.

Any post deposition combination or mix of modeling material formulations is contemplated. For example, once a certain material formulation is dispensed it may preserve its original properties. However, when it is dispensed simultaneously with another modeling material formulation or other dispensed material formulations which are dispensed at the same or nearby locations, a composite material formulation having a different property or properties to the dispensed material formulations may be formed.

The present embodiments thus enable the deposition of a broad range of material formulation combinations, and the fabrication of an object which may consist of multiple different combinations of material formulations, in different parts of the object, according to the properties desired to characterize each part of the object.

Further details on the principles and operations of an AM system suitable for the present embodiments are found in U.S. Published Application No. 20100191360, the contents of which are hereby incorporated by reference.

Figure 4:
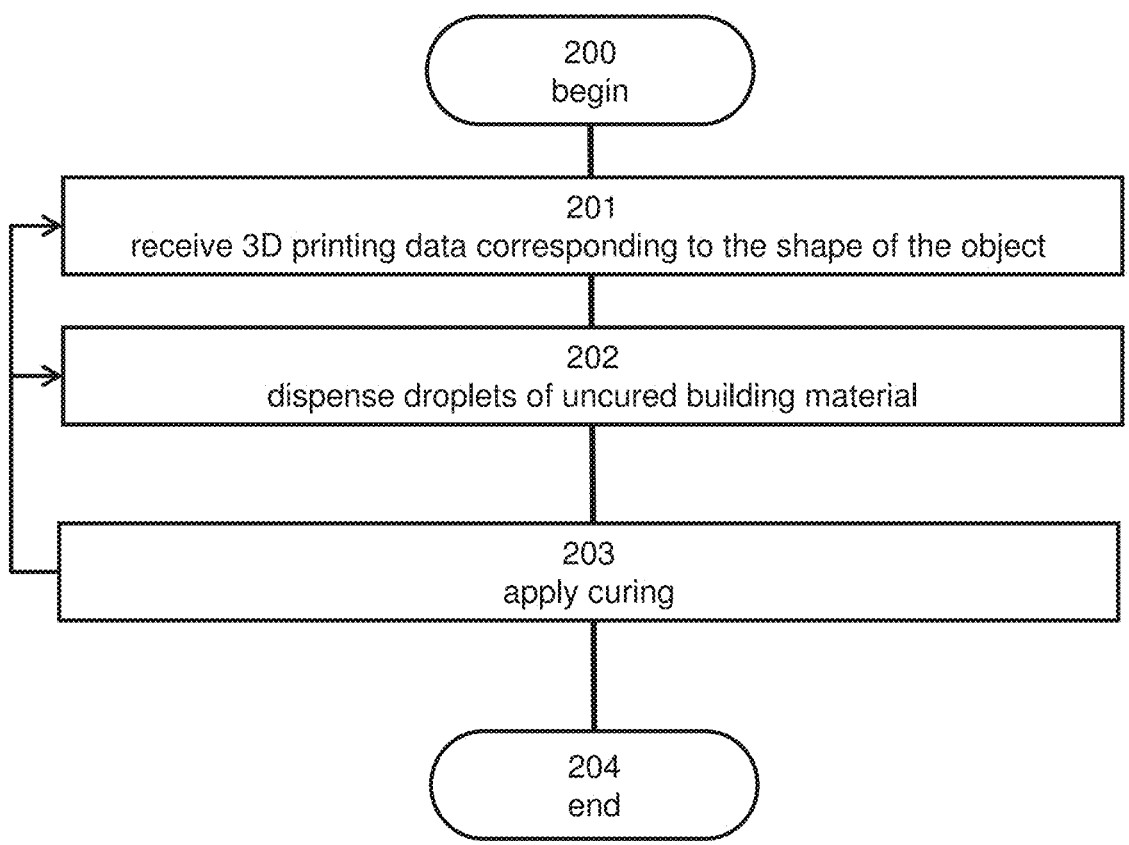
FIG. 4 is a flowchart diagram of a method suitable for AM of a three-dimensional object according to various exemplary embodiments of the present invention.

FIG. 4 is a flowchart diagram of a method suitable for AM of a three-dimensional object according to various exemplary embodiments of the present invention. It is to be understood that, unless otherwise defined, the operations described hereinbelow can be executed either contemporaneously or sequentially in many combinations or orders of execution. Specifically, the ordering of the flowchart diagrams is not to be considered as limiting. For example, two or more operations, appearing in the following description or in the flowchart diagrams in a particular order, can be executed in a different order (e.g., a reverse order) or substantially contemporaneously. Additionally, several operations described below are optional and may not be executed.

The method can be executed by an AM system (e.g., system 110 or system 10), preferably a 3D inkjet printing system, operated by a controller (e.g., controller 152 or 20). The method begins at 200 and optionally and preferably proceeds to 201 at which computer object data that collectively pertain to a three-dimensional shape of the object are received. The data can be received by a data processor (e.g., processor 154 or 24) operatively associated with the AM system. For example, the data processor can access a computer-readable storage medium (not shown) and retrieve the data from the medium. The data processor can also generate the data, or a portion thereof, instead of, or in addition to, retrieving data from the storage medium, for example, by means of a computer aided design (CAD) or computer aided manufacturing (CAM) software. The computer object data typically include a plurality of slice data each defining a layer of the object to be manufactured. The data processor can transfer the data, or a portion thereof, to the controller of the AM system. Typically, but not necessarily, the controller receives the data on a slice-by-slice basis.

The data can be in any data format known in the art, including, any of the aforementioned computer object data formats.

The method proceeds to 202 at which droplets of one or more modeling material formulation(s) are dispensed to form a layer in a configured pattern corresponding to a shape of a slice of the object. The modeling material formulation(s) are as described herein in any of the respective embodiments and any combination thereof.

In some embodiments, a formulation system, that comprises two or more different modeling material formulations, is used. In these embodiments, one or more of the formulations is a formulation as described herein in any of the respective embodiments. In some of these embodiments, all the formulations comprise a radiopaque material and in some embodiments, only some of the formulations comprise a radiopaque material.

The dispensing 202 is optionally and preferably executed while heating the dispensing heads, the fabrication chamber and the dispensed formulation. In various exemplary embodiments of the invention the dispensing 202 is executed at a temperature that ranges from about 50 to about 90° C., or from about 50 to about 80° C. or from about 70 to about 80° C., or from about 65 to about 75° C. The dispensing head can include a heating device or is fed via a building material reservoir which includes a heating device.

At 203 curing radiation is applied to the newly formed layer, preferably using a radiation source (e.g., device 324 or 18).

From operation 203 the method optionally and preferably loops back to 201 to receive data for another slice. When the data for the next slice is already stored within the controller, the method can loop back to 202 for forming the next layer. Once an object formed of a plurality of layers is fabricated, the method ends at 204.

In some of any of the embodiments of the present invention, once the layers are dispensed as described herein, exposure to curing condition (e.g., curing energy) as described herein is effected. In some embodiments, the curable materials are UV-curable materials and the curing condition is such that a radiation source emits UV radiation.

In some embodiments, where the building material comprises also support material formulation(s), the method proceeds to removing the hardened support material (e.g., thereby exposing the adjacent hardened modeling material). This can be performed by mechanical and/or chemical means, as would be recognized by any person skilled in the art. A portion of the support material may optionally remain upon removal, for example, within a hardened mixed layer, as described herein.

In some embodiments, removal of hardened support material reveals a hardened mixed layer, comprising a hardened mixture of support material and modeling material formulation. Such a hardened mixture at a surface of an object may optionally have a relatively non-reflective appearance, also referred to herein as "matte"; whereas surfaces lacking such a hardened mixture (e.g., wherein support material formulation was not applied thereon) are described as "glossy" in comparison.

In some of any of the embodiments described herein, the method further comprises exposing the cured modeling material, either before or after removal of a support material, if such has been included in the building material, to a post-treatment condition. The post-treatment condition is typically aimed at further hardening the cured modeling material. In some embodiments, the post-treatment hardens a partially-cured material to thereby obtain a completely cured material.

While the above description of the system and method places a particular emphasis on embodiments in which the layers are formed by selective dispensing and curing of the building material formulation (e.g., one or more modeling material formulations as described herein and optionally a support material formulation), it is to be understood that more detailed reference to such technique is not to be interpreted as limiting the scope of the invention in any way. For example, other practitioners in the field form the layers by vat-based techniques, such as but not limited to, stereolithography, and DLP (to this end see, e.g., in U.S. Pat. Nos. 4,575,330 and 9,211,678 supra).

Thus, also contemplated are embodiments in which the system comprises a vat-based system or apparatus, e.g., a stereolithography or a DLP system or apparatus. As previously indicated, a vat-based technique comprises a vat containing the material which is exposed to a curing condition, typically is irradiated by curing radiation, in a configured pattern corresponding to the shape of a slice of the object, to form solid objects by successively forming thin layers of a curable material one on top of the other.

When the additive manufacturing is stereolithography, a programmed movable spot beam of curing radiation is directed on a surface or layer of a curable fluid medium (one or more modeling material formulations and optionally also a support material formulation) to form a solid layer of the object at the surface. Typically, the formulations are UV-curable formulations and the curing radiation is UV radiation. Once a solid layer of the object is formed, the layer is moved, in a programmed manner, away from the fluid surface by the thickness of one layer and the next cross-section is then formed and adhered to the immediately preceding layer defining the object. This process is continued until the entire object is formed.

When the additive manufacturing utilizes DLP, a digital light processor projects curing radiation which constitutes a digital image of a slice of the object, preferably from below, to form a solid layer of the object at the surface of the dispensed layer of a curable formulation. Typically, the curable formulation is a UV-curable formulation and the curing radiation is UV radiation. Once a solid layer of the object is formed, the layer is moved, in a programmed manner, away from the image plane of the digital light processor by the thickness of one layer and the next cross-section is then formed and adhered to the immediately preceding layer defining the object. This process is continued until the entire object is formed.

The Modeling Material Formulation:

The modeling material formulation according to the present embodiments is a curable formulation that comprises one or more curable materials and one or more radiopaque materials.

The radiopaque material is a material that is usable as a radiocontrast agent and which inhibits passage of electromagnetic radiation at the radio wave and X-ray range, namely, at a wavelength other than the optical range (e.g., lower than the UV range and higher than the IR range).

The modeling material formulation according to the present embodiments is a radiopaque formulation, which, when hardened (e.g., upon being exposed to a curing condition), provides a material that is radiopaque, namely, inhibits passage of electromagnetic radiation at wavelength outside the optical range.

In some of any of the embodiments described herein, the modeling material formulation is such that provides, when hardened, as described herein, a material that exhibits a positive CT number, e.g., a CT number higher than 0 HU (Hounsfield units).

In some of any of the embodiments described herein, the modeling material formulation is such that provides, when hardened, as described herein, a material that exhibits a CT number higher than 100 HU (Hounsfield units).

In some of any of the embodiments described herein, the modeling material formulation is such that provides, when hardened, as described herein, a material that exhibits a CT number higher than 200 HU (Hounsfield units).

In some of any of the embodiments described herein, the modeling material formulation is such that provides, when hardened, as described herein, a material that exhibits a CT number higher than 300 HU (Hounsfield units).

In some of any of the embodiments described herein, the modeling material formulation is such that provides, when hardened, as described herein, a material that exhibits a CT number higher than 500 HU (Hounsfield units).

In some of any of the embodiments described herein, the modeling material formulation is such that provides, when hardened, as described herein, a material that exhibits a CT number higher than 1000 HU (Hounsfield units), or higher than 1500 HU or higher than 2000 HU, and even higher than 2000 HU.

In some of any of the embodiments described herein, the modeling material formulation is such that provides, when hardened, as described herein, a material that exhibits a CT number that ranges from 100 to 20000, or from 100 to 10000, or from 200 to 10000, or from 300 to 10000, or from 500 to 10000, or from 1000 to 10000, HU, including any intermediate values and subranges therebetween.

"Computed Tomography," abbreviated "CT," as defined herein and also known as computed axial tomography or computer-assisted tomography (CAT) and body section roentgenography, is a medical imaging method employing tomography where digital processing is used to generate a three-dimensional image of the internals of an object (or subject) from a large series of two-dimensional X-ray images taken around a single axis of rotation. While the discussion herein focuses on computed tomography, it will be appreciated by those of skill in the art that such discussions apply generally to all types of X-ray imaging.

Herein, and in the art, the expression "CT number" describes a selectable scan factor based on the Hounsfield scale. Each elemental region of a CT image (pixel) is expressed in terms of Hounsfield units (HU) corresponding to the x-ray attenuation. CT numbers are typically displayed as gray-scale pixels on a viewing monitor. White represents pixels with higher CT numbers. Varying shades of gray are assigned to intermediate CT numbers. Black represents regions with lower CT numbers.

In CT imaging, X-rays from a radiation source pass through a volume of a subject or object and are detected by detectors. The energies of the X-rays are emitted in a distribution with a peak energy according to a CT imaging device and a set of imaging parameters, e.g. imaging protocol. The detected X-ray radiation, in the form of projection data, is reconstructed into volumetric image data, which can be presented as image slices or other divisions of the volume. The volumetric image data is reconstructed with voxel values in Hounsfield Units (HU). The range of Hounsfield Units is approximately from −1000 to 3000, e.g. range of 4096 values or 12-bit, which are based on measures of attenuation normalized with water at zero.

Reference settings are typically based on the type of imaging protocol selected for the imaging procedure, and the measured HU correlate to acquisition parameters, such as the set tube potential or emitted peak energy (kV).

The volumetric image data at different energy levels is typically displayed using the same reference settings of a window level (WL), e.g. mean/median of selected HU values, and a window width (WW), e.g. the selected range of HU values.

Determining the CT number is in accordance with methods known in the art. An exemplary procedure is described in the Examples section that follows.

The radiopaque material according to the present embodiments encompasses any material known as, or as forming a part of, a contrast agent or as a radiocontrast agent, or an agent usable in X-ray or computed tomography imaging. A radiopaque material can significantly attenuate incident X-ray radiation causing a reduction of the radiation transmitted through the volume of interest.

The radiopaque material included in the formulation can be any material that is known in the art as such and/or which exhibits per se a CT number as described herein for the formulation.

As described hereinabove, radiopaque materials typically include one or more elements with high atomic number and/or high-density liquid materials.

The radiopaque material can be a single chemical entity, for example, a chemical element or a chemical compound, or a mixture of two or more chemical elements and/or chemical compounds, or a dispersion or solution of a chemical element or compound in a liquid carrier.

In some embodiments, the radiopaque material is or comprises a chemical element having high atomic number, e.g., an atomic number higher than 40, or higher than 50. Exemplary such elements that are currently in use as radiopaque agents include, but are not limited to, Iodine, Barium, Gadolinium, Ytterbium, Tantalum, Tungsten, Gold, and Bismuth. Other elements are also contemplated.

In some embodiments, the radiopaque material is a chemical compound that comprises one or more elements having a high atomic number, as described herein, for example, iodine-containing compounds, barium-containing compounds, gadolinium-containing compounds, Ytterbium-containing compounds, tantalum-containing compounds, tungsten-containing compounds, gold-containing compounds, and bismuth-containing compounds.

Exemplary iodine-containing compounds include, but are not limited to, water soluble compounds (which are also referred to in the art as ionic compounds) and water insoluble compounds (which are also referred to in the art as non-ionic compounds). Exemplary water-soluble iodine-containing compounds include, but are not limited to, potassium iodide, diatrizoate, metrizoate, iothalamate and ioxaglate. Exemplary water-insoluble compounds include, but are not limited to, iopamidol, iohexol, ioxilan, iopromide, iodixanol, and ioversol. Any other radiopaque iodine-containing compound is contemplated.

A radiopaque material that comprises an iodine-containing compound can include the compound per se or as a solution is water or any other suitable solvent.

Exemplary barium-containing compounds mainly include inorganic barium salts, the most commonly used as radiocontrast agent being barium sulfate ($BaSO_4$). Another example is barium nitrate ($Ba(NO_3)_2$). Other organic and inorganic barium salts are also contemplated.

Exemplary gadolinium-containing compounds include, but are not limited to, gadolinium inorganic salts such as, for example, $GaCl_3$, and gadolinium organic salts or organometallic Ga(III) complexes such as, but not limited to, gadoterate, gadodiamide, gadobenate, gadopentate, gadoteridol, gadoversetamide, gadobutrol, gadopentetic acid dimeglumine, gadofosveset, gadocoletic acid, gadomelitol, gadomer 17, and gadoxetic acid.

Exemplary Ytterbium-containing compounds include, but are not limited to, Ytterbium halides such as $YbCl_3$ and $YbF_3$.

Exemplary tantalum-containing compounds include, but are not limited to, tantalum inorganic salts, tantalum oxides, coated forms thereof and organometallic complexes of tantalum, tantalum salt, or of tantalum oxide. An exemplary compound has a chemical formula $(Ta_2O_5)(C_7H_{14}NO_5Si)_{2.8}$, which includes coated tantalum oxide particles. A tantalum-containing compound can be tantalum per se.

Exemplary tungsten-containing compounds include, but are not limited to, tungsten per se, tungsten inorganic salts such as, for example, tungsten disulfide, tungsten oxides, coated forms thereof and organometallic complexes of tungsten, tungsten salt, or of tungsten oxide.

Exemplary gold-containing compounds include, but are not limited to, gold per se, gold halides such as $AuCl_3$, and organometallic complexes of gold or halide or oxide thereof.

Exemplary bismuth-containing compounds include, but are not limited to, organic and inorganic salts or complexes of bismuth or bismuth or bismuth oxide, such as, for example, Bismuth oxychloride, bismuth subcarbonate ($BiO_2CO_3$), bismuth trioxide, bismuth tungsten oxide, bismuth (III) titanate, bismuth telluride, and bismuth molybdate.

In some of any of the embodiments described herein, the radiopaque material is in a form of particles. Preferably, the average size (e.g., diameter) of the particles is lower than 1 micron, more preferably less than 500 nm, and more preferably less than 100 nm. In some embodiments, the average size of the particles is in a range of from 1 to 500 nm, or from 1 to 200 nm, or from 1 to 100 nm, or from 1 to 80 nm, including any intermediate value and subranges therebetween. Thus, nanoparticles or nanopowder of any of the foregoing radiopaque materials are preferably included in the formulation.

In some of any of the embodiments described herein, the radiopaque material is or comprises a plurality of nanoparticles as described herein of a barium-containing compound, a gadolinium-containing compound, an Ytterbium-containing compound, a tantalum-containing compound, a tungsten-containing compound, a gold-containing compound, or a bismuth-containing compound, as described herein.

In some of any of the embodiments described herein, the radiopaque material is or comprises a plurality of nanoparticles as described herein of a barium-containing compound, a tantalum-containing compound, or a tungsten-containing compound, as described herein.

In some of any of the embodiments described herein, the radiopaque material is or comprises a barium-containing compound, and in some embodiments the barium-containing compound is barium sulfate.

In some of any of the embodiments described herein, the radiopaque material is or comprises a plurality of nanoparticles of a barium sulfate.

In some of any of the embodiments described herein, when the radiopaque material is in a form of nanoparticles or nanopowder, it can be included in the formulation, along with curable material(s), as particles (dispersed in the curable material(s), or as a liquid carrier in which the particles are dispersed, and mixed with the curable material(s).

Any of the above-mentioned radiopaque materials can be in a form of a dispersion or solution of a radiopaque compound as described herein in a liquid carrier. The carrier can be a curable carrier or a non-curable carrier. The carrier is preferably chemically compatible with the curable materials in the formulation. The carrier may bean hydrophilic or amphiphilic carrier like, for example, water, an alcoholic solvent, an alkylene glycol, a poly(alkylene glycol), or any combination thereof.

The concentration of the nanoparticles or nanopowder in the liquid carrier may be in a range of from about 1 to about 80%, or from about 10 to about 80%, or from about 20 to about 80%, or from about 30 to about 80%, by weight, including any intermediate values and subranges therebetween.

The radiopaque material can alternatively be in a liquid form, for example, a liquid element or chemical compound, that is an element or compound that is liquid at room temperature and atmospheric pressure.

Preferably, a liquid radiopaque material is a high density liquid that features a density of 2 grams/cm$^3$ or higher, e.g., higher than 2, higher than 3, or higher than 4, at room temperature (e.g., 25° C.).

The liquid radiopaque material can be, for example, bromo- and iodo-containing organic and inorganic liquid compounds, organic thallium salts, liquid metals and metal alloys, mercury, and sodium polytungstate solutions.

Exemplary liquid radiopaque materials are presented in Table 1 below.

TABLE 1

| Material | Density (gram/cm$^3$) |
| --- | --- |
| 1,2-Dibromoethane | 2.180 |
| cis-1,2-Dibromoethene | 2.246 |
| trans-1,2-Dibromoethene | 2.231 |
| 1,2-Dibromomethane | 2.477 |
| Bromal | 2.550 |
| Bromoform | 2.890 |
| 1,1,2,2-tetrabromoethane (Muthmanns solution) | 2.967 |
| Sodium polytungsten | 3.100 |
| Bromine | 3.1028 |
| Troulets solution | 3.196 |
| Diiodomethane | 3.325 |
| Indium iodide | 3.40 |
| Bariummercuric iodide | 3.57 |
| Thalium formate + Thalium malonate (Clerici solution) | 4.25 |
| Liquid metal (Gallium/Tin/Zinc alloy) | 6.5 |
| Mercury | 13.6 |

An additional example is perfluorodecalin.

In some of any of the embodiments described herein, the radiopaque material is a curable material, which preferably comprises one or more curable (e.g., polymerizable or cross-linkable) groups as described herein and one or more atoms of a radiopaque element or one or more chemical group(s) containing such atoms.

In some embodiments, the curable radiopaque material comprises the one or more atoms of a radiopaque element or one or more group(s) containing such atoms as substituent(s) of a polymerizable or cross-linkable material.

In some embodiments, a curable radiopaque material is a curable material as described herein in any of the respective embodiments, which includes one or more substituents of a radiopaque element or containing a radiopaque element.

In some of these embodiments, the radiopaque element is bromine or iodine, and the radiopaque curable material is a curable material that has one or more bromine and/or iodine substituents.

In some of any of these embodiments, the curable material is an acrylic material, which can be, for example, mono-functional or multi-functional acrylate, methacrylate, acrylamide, methacrylamide, and any combination of the foregoing.

The following lists exemplary bromine-containing curable (acrylic) materials which are usable in the context of some of the present embodiments:

2-(2-bromoisobutyryloxy)ethyl methacrylate (BIEM);
3-bromo-2,2-bisbromomethyl)propyl acrylate (Trinol);
2,4,6-tribromophenyl acrylate, (KOWA);
EO-modified trybromophenyl acrylate, (KOWA, Cytec);
Pentabromophenyl methacrylate (Cytec);
2,3-dibromopropyl acrylate; and
Pentabromobenzyl acrylate.

The following lists exemplary iodine-containing curable (acrylic) materials which are usable in the context of some of the present embodiments:

Cyclophosphazenes (HEMA-co-iodoaniline substituted cyclotriphosphazenes), which can be prepared as described in *Synthesis of iodine-containing cyclophosphazenes for using as radiopacifiers in dental composite resin*", Zhao et al., Materials Science and Engineering: C, 2014, 43:432-438;
2-[4-iodobenzoyl]-oxo-ethylmethacrylate (4-IEMA);
2-[2',3',5'-triiodobenzoyl]ethyl methacrylate (TIBMA), as described in *Elimination of barium sulphate from acrylic bone cements. Use of two iodine-containing monomers*, Artola et al., Biomaterials, 2003, 24(22): 4071-4080;
3,5-diodine salicylic methacrylate (DISMA), as described in *Elimination of barium sulphate from acrylic bone cements. Use of two iodine-containing monomers*, Artola et al., Biomaterials, 2003, 24(22): 4071-4080; and 4-iodobenzoyl-oxo-ethylmethacrylate.

In some of any of the embodiments described herein, the radiopaque material comprises an opaque material and a curable carrier.

In some of these embodiments, the radiopaque material comprises a solid opaque material dispersed in a curable carrier.

Opaque materials that are usable in the context of these embodiments include, but are not limited to, alumina ($Al_2O_3$), titania (titanium oxide), silica, and like materials.

The solid opaque material can be in a form of particles, for example, nanoparticles, as described herein.

The curable carrier comprises one or more curable materials as described herein, which can be monofunctional and/or di-functional curable materials (e.g., acrylic materials).

The curable carrier can further comprise one or more non-curable materials, including polymeric and/or non-polymeric non-curable materials.

Herein throughout, the term "non-curable" encompasses materials that are non-polymerizable under any conditions or materials that are non-curable under conditions at which the curable materials as described herein are curable, or under any condition used in a fabrication of an object according to the present embodiments. Such materials are typically devoid of a curable or polymerizable group or of a UV-photopolymerizable group. In some embodiments, the material is non-reactive towards the curable materials as described herein, that is, it does not react with the curable materials and is incapable of interfering with the curing of the curable materials, under the fabrication conditions, including the curing conditions.

According to some of any of the embodiments described herein, an amount of the radiopaque material in the formulation is in a range of from 5 to 50%, or from 5 to 30%, or from 5 to 25%, by weight, of the total weight of the formulation, including any intermediate value and subranges therebetween.

A suitable amount of the radiopaque material can be determined by those skilled in the art, depending on the desired radiopacity of the hardened formulation (the CT number), the stability of the formulation, and the suitability of the formulation to the AM system and method (e.g., in terms of its viscosity, surface tension, thermal stability, etc.).

The one or more curable materials included in the formulation in addition to the radiopaque material can be selected to provide, when hardened, a material which features mechanical, physical and thermal properties as desired.

In some embodiments, the one or more curable materials are selected so as to provide, when hardened, a material that exhibits one or more of a tensile strength, tensile modulus, flexural strength, flexural modulus, elongation at break, HDT, Impact resistance, and Shore A hardness as desired for the hardened material (e.g., as described for a 3D object formed thereof or a part thereof).

In exemplary embodiments, the one or more curable materials are selected such that the modeling material formulation as described herein provides, when hardened, one or more of the following:

HDT higher than 40° C.; tensile strength higher than 50 MPa, flexural strength higher than 50 Mpa; and Flexural modulus higher than 1000 MPa.

In some embodiments, the one or more curable materials form a part of a curable formulation that provides the above-mentioned properties.

In some embodiments, the curable formulation is any commercially available, or otherwise described, curable formulation or formulation system, that is compatible with the radiopaque material, that is, can be mixed with a selected radiopaque material to form a stable mixture, dispersion or solution, that is compatible with the AM system or process.

In some of any of the embodiments described herein, the AM process is 3D inkjet printing and the curable formulation that is mixed with the radiopaque material is a curable formulation suitable for 3D inkjet printing.

In some of any of the embodiments described herein, the modeling material formulation features properties, such as viscosity, surface tension, jettability and reactivity (e.g., curing/hardening time) that meet the requirements of 3D inkjet printing, as described herein.

In some of any of the embodiments described herein, the modeling material formulation features a viscosity of from 8 to about 50, or from 8 to about 30, or from 8 to about 25, centipoises, at 75° C.

Exemplary curable formulations that can be included in a modeling material formulation as described herein along with the radiopaque material include, but are not limited to, formulations that provide stiff and hard materials (e.g., curable formulations marketed by the present Assignee as the Vero™ Family materials), formulation that provide soft and flexible materials (e.g., curable formulations marketed by the present assignee as the Tango™ and Agilus™ families), and formulation systems usable for forming Digital ABS objects, which contain a shelled multi-material made of two starting materials (e.g., RGD515™ & RGD535/531™, as marketed by the present Assignee).

Additional exemplary curable formulations are described, for example, in PCT International Patent Applications having Publication Nos. WO 2016/142947; WO 2017/029657; and WO 2017/122211.

Optionally, the curable formulation is selected so as to mimic the properties of certain tissues or organs, for example, of hard tissues such as bones, soft tissues such as flesh, and/or the vascular system. Such formulations are described, for example, in PCT International Patent Application Publication Nos. WO 2019/021291, WO 2019/021292, WO 2019/021293, WO 2019/021294, and WO 2019/021295, all by the present Assignee and all being incorporated by reference as if fully-set forth herein.

In some of the embodiments described herein for a curable radiopaque material, the one or more curable materials and the curable radiopaque material are curable upon exposure to the same curing condition.

In some of any of the embodiments described herein, all the curable materials in the formulation are photocurable materials, e.g., UV-curable materials, for example, acrylic materials as described herein.

In some of any of the embodiments described herein, the modeling material formulation further comprises an agent for promoting the hardening of the formulation, which in the case of UV-curable materials, is a photoinitiator or a photoinitiator system which comprises two or more materials, as described hereinbelow.

In some embodiments, a curable formulation that is mixed with the radiopaque material comprises a photoinitiator, and in some of these embodiments, an additional amount of a photoinitiator is added in order to provide the final formulation with a suitable reactivity (e.g., a curing/hardening time as described herein).

In some of any of the embodiments described herein for UV-curable materials, a total amount of the photoinitiator (or a photoinitiator system) ranges from 1 to 10%, or from 2 to 10%, or from 2 to 6%, by weight of total weight of the formulation.

In some of any of the embodiments described herein, the modeling material formulation further comprises a surfactant and/or dispersant. In some of these embodiments, the radiopaque material comprises particles, e.g., nanoparticles, of a radiopaque material as described herein.

In some of these embodiments, a curable formulation that is mixed with the radiopaque material comprises a surfactant and/or dispersant, and in some of these embodiments, an additional amount of a surfactant and/or a dispersant is added in order to further stabilize the final formulation.

In some of any of these embodiments, the total amount of a surfactant and/or a dispersant ranges from 0.01 to 5% by weight of the total weight of the formulation, including any intermediate values and subranges therebetween.

In some of any of the embodiments described herein, a modeling material formulation as described herein is prepared by mixing the one or more curable materials and the radiopaque material, and optionally one or more photoinitiators, surfactants and/or dispersants, and further optionally other additives as described herein. The mixing can be effected at room temperature or at an elevated temperature of, e.g., up to 70, or up to 60, or up to 50, or up to 40° C.

In some embodiments, the mixing is of an available curable formulation and the radiopaque material, and optionally of added one or more photoinitiators, surfactants and/or dispersants and/or other additives as described herein.

In some of any of the embodiments described herein, the amount of the curable materials in the formulation ranges from 50% to 95%, including any intermediate values and subranges therebetween.

In some of any of the embodiments described herein, the one or more curable materials comprise one or more monofunctional curable materials.

In some of any of the embodiments described herein, the one or more curable materials comprise one or more monofunctional curable materials each featuring, when hardened, Tg higher than 50° C., or a Tg in a range of from 50 to 150° C., or from 50 to 100, ° C., including any intermediate values and subranges therebetween.

Depending on the desired hardness, stiffness, elasticity and structure of the final object, the one or more curable materials can further comprise one or more multi-functional curable material which features, when hardened, Tg higher than 50° C. (e.g., from 50 to 250° C., or from 80 to 250° C., or from 80 to 200° C., or from 100 to 250° C., or from 100 to 200° C., or from 150 to 250° C., or from 150 to 200° C., including any intermediate values and subranges therebetween) and/or one or more monofunctional or multifunctional curable materials that provide, when hardened, materials with low Tg, e.g., lower than 50° C., or lower than 20° C., or lower than 10° C., or lower than 0° C. (e.g., of from −20 to 50° C., or from −20 to 20° C., or from 0 to 20° C., including any intermediate values and subranges therebetween).

In some embodiments, an exemplary, non-limiting, formulation comprises one or more monofunctional curable material(s) that features, when hardened, Tg higher than 50° C., as described herein, and one or more of a monofunctional curable material(s) that features, when hardened, Tg lower than 20° C., as described herein; a multifunctional curable material(s) that features, when hardened, Tg higher than 50° C., as described herein; and multifunctional curable material(s) that features, when hardened, Tg lower than 20° C., as described herein.

In some of these embodiments, a total amount of the one or more monofunctional curable material(s) that feature, when hardened, Tg higher than 50° C. is at least 20%, or is from 20 to 50%, or from 20% to 40%, or from 30 to 40%, by weight, of the total weight of the formulation.

In some of these embodiments, a total amount of the one or more monofunctional curable material(s) that feature, when hardened, Tg lower than 20° C. ranges from 1 to 20%, or from 5 to 15%, by weight, of the total weight of the formulation.

In some of these embodiments, a total amount of the multifunctional curable material(s) that features, when hardened, Tg higher than 50° C. ranges from 5% to 15%, or from 5% to 10%, by weight, of total weight of the formulation.

In some of these embodiments, a total amount of the multifunctional curable material(s) that features, when hardened, Tg lower than 20° C. ranges from 10 to 30%, or from 15 to 25% by weight, of the total weight of the formulation.

Herein throughout, "Tg" refers to glass transition temperature defined as the location of the local maximum of the E" curve, where E" is the loss modulus of the material as a function of the temperature.

Broadly speaking, as the temperature is raised within a range of temperatures containing the Tg temperature, the state of a material, particularly a polymeric material, gradually changes from a glassy state into a rubbery state.

Herein, "Tg range" is a temperature range at which the E" value is at least half its value (e.g., can be up to its value) at the Tg temperature as defined above.

Without wishing to be bound to any particular theory, it is assumed that the state of a polymeric material gradually changes from the glassy state into the rubbery state within the Tg range as defined above. Herein, the term "Tg" refers to any temperature within the Tg range as defined herein.

Unless otherwise indicated, all Tg values used to describe a curable material refer to a hardened material (e.g., a polymer) formed of the indicated material per se.

Exemplary monofunctional curable materials featuring Tg higher than 50° C. as described herein include, but are not limited to, ACMO, IBOA and Exo-1,7,7-trimethylbicyclo [2.2.1] hept-2-yl acrylate. In some exemplary embodiments, the formulation comprises all of these curable materials.

Exemplary multifunctional curable materials featuring Tg higher than 50° C. include, but are not limited to, Tris (2-hydroxyethyl) isocyanurate triacrylate (THEICTA), commercially available under the name SE368; short-chain alkylene glycol-containing (ethoxylated) di-functional and tri-functional acrylate monomers such as, for example, DPGDA (commercially available under the name SR508), ethoxylated 3 trimethylolpropane triacrylate (TMP3EOTA), commercially available under the name SR454, and long-chain or high-carbon ring multifunctional acrylate monomers such as, for example, Tricyclodecanedimethanol diacrylate (TCDDMDA), commercially available under the name SR833S, and also SR595, SR355, and others. In some exemplary embodiments, the formulation comprises SR833S.

Exemplary monofunctional curable materials featuring Tg lower than 20° C. include, but are not limited to, monofunctional urethane acrylate such as those marketed under the Genomer family, and monofunctional elastomeric materials such as, for example, the material marketed as CN131B.

Exemplary multifunctional curable materials featuring Tg lower than 20° C. include, but are not limited to, polyethylene glycol diacrylate, polyethylene glycol dimethacrylate, aliphatic polyether-based or polyester-based urethane diacrylate, polyethylene glycol-polyethylene glycol urethane diacrylate, an acrylated oligourethane, a partially acrylated polyol oligomer, and other ethoxylated multifunctional materials such as, for example, ethoxylated bisphenol A dimethacrylate, ethoxylated trimethylol propane triacrylate. In exemplary embodiments, the formulation comprises an aliphatic polyester-based urethane diacrylate such as marketed under the trade name CN991.

In exemplary embodiments, the modeling material formulation is prepared using a curable formulation marketed by the present Assignee as VeroClear™, optionally while adding thereto an additional amount of a photoinitiator and/or an additional amount of a surfactant and/or dispersant.

In some of any of the embodiments described herein, the modeling material formulation independently further comprises one or more additional materials, which are referred to herein also as non-reactive materials (non-curable materials).

Such agents include, for example, surface active agents (surfactants), dispersants, inhibitors, antioxidants, fillers, pigments and/or dyes (other than the radiopaque material).

Surface-active agents may be used to reduce the surface tension of the formulation to the value required for jetting or for printing process, which is typically around 30 dyne/cm. Such agents include silicone materials, for example, organic polysiloxanes such as PDMS and derivatives therefore, such as those commercially available as BYK type surfactants.

Suitable dispersants (dispersing agents) can also be silicone materials, for example, organic polysiloxanes such as PDMS and derivatives therefore, such as those commercially available as BYK type surfactants.

Suitable stabilizers (stabilizing agents) include, for example, thermal stabilizers, which stabilize the formulation at high temperatures.

The term "filler" describes an inert material that modifies the properties of a polymeric material and/or adjusts a quality of the end products. The filler may be an inorganic particle, for example calcium carbonate, silica, and clay.

Fillers may be added to the modeling formulation in order to reduce shrinkage during polymerization or during cooling, for example, to reduce the coefficient of thermal expansion, increase strength, increase thermal stability, reduce cost and/or adopt rheological properties. Nanoparticles fillers are typically useful in applications requiring low viscosity such as ink-jet applications.

In some embodiments, a concentration of each of a stabilizer and/or a filler, if present, ranges from 0.01 to 2%, or from 0.01 to 1%, by weight, of the total weight of the formulation.

In some embodiments, the modeling material formulation further comprises an inhibitor. The inhibitor is included for preventing or reducing curing before exposure to curing energy. Suitable inhibitors include, for example, those commercially available as the Genorad type, or as MEHQ. Any other suitable inhibitors are contemplated.

The pigments can be organic and/or inorganic and/or metallic pigments, and in some embodiments the pigments are nanoscale pigments, which include nanoparticles.

Exemplary inorganic pigments include nanoparticles of titanium oxide, and/or of zinc oxide and/or of silica. Exemplary organic pigments include nanosized carbon black.

In some embodiments, the pigment's concentration ranges from 0.1 to 2% by weight, or from 0.1 to 1.5%, by weight, of the total weight of the formulation.

The dye may be any of a broad class of solvent soluble dyes. Some non-limiting examples are azo dyes which are yellow, orange, brown and red; anthraquinone and triarylmethane dyes which are green and blue; and azine dye which is black.

Non-limiting examples of suitable photoinitiators include benzophenones (aromatic ketones) such as benzophenone, methyl benzophenone, Michler's ketone and xanthones; acylphosphine oxide type photo-initiators such as 2,4,6-trimethylbenzolydiphenyl phosphine oxide (TMPO), 2,4,6-trimethylbenzoylethoxyphenyl phosphine oxide (TEPO), and bisacylphosphine oxides (BAPO's); benzoins and bezoin alkyl ethers such as benzoin, benzoin methyl ether and benzoin isopropyl ether and the like. Examples of photoinitiators are alpha-amino ketone, bisacylphosphine oxide (BAPO's), and those marketed under the tradename Irgacure®.

A photo-initiator may be used alone or in combination with a co-initiator. Benzophenone is an example of a photoinitiator that requires a second molecule, such as an amine, to produce a free radical. After absorbing radiation, benzophenone reacts with a ternary amine by hydrogen abstraction, to generate an alpha-amino radical which initiates polymerization of acrylates. Non-limiting example of a class of co-initiators are alkanolamines such as triethylamine, methyldiethanolamine and triethanolamine.

In some embodiments, a photoinitator system that comprises two or more initiators is usable. In exemplary embodiments, a photoinitiator system that comprises one (or more) photoinitiator(s) of the benzophenone family and one (or more) photoinitiator(s) of the TMPO or TEPO family, is used.

In some embodiments, a total concentration of a photoinitiator or a photoinitiator system is in a range of from about 0.1 to about 8%, or from about 1 to about 8%, or from about 1 to about 6%, or from about 2 to about 8%, or from about 2 to about 6%, or from about 3 to about 8%, or from about 3 to about 6%, by weight, of the total weight of the formulation, including any intermediate values and subranges therebetween.

The modeling material formulation as described herein, in any of the respective embodiments and any combination thereof, can be provided within a kit. In some embodiments, all the components of the formulation are packaged together within the kit. In some embodiments, the curable materials and the radiopaque material are each packaged individually within the kit, and the kit further comprises instructions to mix these components either prior to use or during the AM process (for example, feed these components separately into a dispensing head, and mix therein the components prior to dispensing the formulation). In some embodiments, the photoinitiator(s) are packaged individually within the kit and are added to the curable materials prior to use in the AM process.

In exemplary embodiments, the formulation(s) are packaged within the kit in a suitable packaging material, preferably, an impermeable material (e.g., water- and gas-impermeable material), and further preferably an opaque material. In some embodiments, the kit further comprises instructions to use the formulations in an additive manufacturing process, preferably a 3D inkjet printing process as described herein. The kit may further comprise instructions to use the formulations in the process in accordance with the method as described herein.

The modeling formulation as described herein in any of the respective embodiments is also referred to herein as radiopaque modeling material formulation.

When used in an AM process as described herein in a multi-material mode, it can be used in combination with any commercially available or otherwise prepared modeling material formulation, as long as it is chemically compatible with the radiopaque material.

The object:

According to an aspect of some embodiments of the present invention there is provided a three-dimensional object which comprises, in at least a portion thereof, a hardened material formed of a modeling material formulation as described herein.

According to some embodiments, the object is obtained upon exposing a molded formulation to a curing condition.

According to some embodiments, the object is obtained by an AM process, e.g., 3D inkjet printing, as described herein in any of the respective embodiments, using the modeling material formulation as described herein, optionally in combination with other modeling material formulation(s).

According to some embodiments, the object is usable as a radiological phantom, as defined herein and in the art.

According to some embodiments, the object is for use as a radiological phantom, for evaluating, tuning and/or calibrating a radioimaging system. Exemplary radioimaging systems include, but are not limited to, a computed tomography (CT) imaging system, a helical CT system, a positron emission tomography (PET) system, including PET-CT system and SPECT, a magnetic resonance imaging (MRI) system, a 2D or 3D fluoroscopic imaging system, an X-ray system, and a hybrid-imaging system capable of performing two or more of CT, MRI, PET, ultrasound or other imaging techniques, and any other radiographic system that utilizes contrast agents.

The object can be fabricated from a modeling material formulation as described herein, so as to feature a size, shape, and other geometrical and/or textural properties, that are suitable for an indicated application.

For example, the object can be fabricated by AM so as to feature a shape and/or texture of a bodily organ or tissue.

In such embodiments, the AM process can be performed in accordance with data in a format suitable for Digital Imaging and Communications in Medicine (hereinafter DICOM data).

The DICOM data can be received from an acquisition console such as, but not limited to, an MRI system, a CT imaging system, a helical CT system, a positron emission tomography (PET) system, a 2D or 3D fluoroscopic imaging system, a 2D, 3D, or 4D ultrasound imaging system, an endoscope system, a bedside monitor system, an x-ray system, and a hybrid-imaging system capable of CT, MR, PET, ultrasound or other imaging techniques. The DICOM data preferably includes one or more digital image data describing one or more bodily structures comprising one or more bodily tissue elements.

The DICOM data can be converted to computer object data, as described herein. For instance, the computer object data can be in any known format, including, without limitation, a Standard Tessellation Language (STL) or a Stereo-Lithography Contour (SLC) format, Virtual Reality Modeling Language (VRML), Additive Manufacturing File (AMF) format, Drawing Exchange Format (DXF), Polygon File Format (PLY) or any other format suitable for Computer-Aided Design (CAD), e.g., Wavefront file format (OBJ). The conversion from DICOM data to computer object data optionally and preferably includes one or more segmentation procedures, selected from the group consisting of thresholding, region growing, dynamic region growing, and the like.

In some cases, input data are received from a computer readable medium as computer object data, in which case it is not necessary to obtain and convert the DICOM data.

In any event, according to these embodiments, the computer object data preferably include data pertaining to a shape of one or more bodily structures comprising one or more bodily tissue elements, as desired.

According to an aspect of some embodiments of the present invention, there is provided a method of evaluating, tuning and/or calibrating a radioimaging system as described herein, the method comprising manufacturing a three-dimensional object as described herein in any of the respective embodiments, preferably featuring a shape and/or texture of a desired bodily organ or tissue, as described herein, placing the object in an imaging system and measuring the CT number of the object under various conditions or system parameters, to thereby evaluate, tune and/or calibrate the radioimaging system. Manipulating the conditions and system parameters can be made by methods known in the art.

It is expected that during the life of a patent maturing from this application many relevant radiopaque materials will be developed and the scope of the term "radiopaque material" is intended to include all such new technologies a priori.

It is expected that during the life of a patent maturing from this application many relevant radioimaging systems will be developed and the scope of the term "radioimaging system" is intended to include all such new technologies a priori.

As used herein the term "about" refers to ±10% or ±5%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

Herein throughout, the term "(meth)acrylic" encompasses acrylic and methacrylic compounds.

Herein throughout, the phrase "linking moiety" or "linking group" describes a group that connects two or more moieties or groups in a compound. A linking moiety is typically derived from a bi- or tri-functional compound, and can be regarded as a bi- or tri-radical moiety, which is connected to two or three other moieties, via two or three atoms thereof, respectively.

Exemplary linking moieties include a hydrocarbon moiety or chain, optionally interrupted by one or more heteroatoms, as defined herein, and/or any of the chemical groups listed below, when defined as linking groups.

When a chemical group is referred to herein as "end group" it is to be interpreted as a substituent, which is connected to another group via one atom thereof.

Herein throughout, the term "hydrocarbon" collectively describes a chemical group composed mainly of carbon and hydrogen atoms. A hydrocarbon can be comprised of alkyl, alkene, alkyne, aryl, and/or cycloalkyl, each can be substituted or unsubstituted, and can be interrupted by one or more heteroatoms. The number of carbon atoms can range from 2 to 20, and is preferably lower, e.g., from 1 to 10, or from 1 to 6, or from 1 to 4. A hydrocarbon can be a linking group or an end group.

Bisphenol A is an example of a hydrocarbon comprised of 2 aryl groups and one alkyl group.

As used herein, the term "amine" describes both a —NR'R" group and a —NR'— group, wherein R' and R" are each independently hydrogen, alkyl, cycloalkyl, aryl, as these terms are defined hereinbelow.

The amine group can therefore be a primary amine, where both R' and R" are hydrogen, a secondary amine, where R' is hydrogen and R" is alkyl, cycloalkyl or aryl, or a tertiary amine, where each of R' and R" is independently alkyl, cycloalkyl or aryl.

Alternatively, R' and R" can each independently be hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, carbonyl, C-carboxylate, O-carboxylate, N-thiocarbamate, O-thiocarbamate, urea, thiourea, N-carbamate, O-carbamate, C-amide, N-amide, guanyl, guanidine and hydrazine.

The term "amine" is used herein to describe a —NR'R" group in cases where the amine is an end group, as defined hereinunder, and is used herein to describe a —NR'— group in cases where the amine is a linking group or is or part of a linking moiety.

The term "alkyl" describes a saturated aliphatic hydrocarbon including straight chain and branched chain groups. Preferably, the alkyl group has 1 to 30, or 1 to 20 carbon atoms. Whenever a numerical range; e.g., "1-20", is stated herein, it implies that the group, in this case the alkyl group, may contain 1 carbon atom, 2 carbon atoms, 3 carbon atoms, etc., up to and including 20 carbon atoms. The alkyl group may be substituted or unsubstituted. Substituted alkyl may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, N-carbamate, O-carbamate, C-amide, N-amide, guanyl, guanidine and hydrazine.

The alkyl group can be an end group, as this phrase is defined hereinabove, wherein it is attached to a single adjacent atom, or a linking group, as this phrase is defined hereinabove, which connects two or more moieties via at least two carbons in its chain. When the alkyl is a linking group, it is also referred to herein as "alkylene" or "alkylene chain".

Herein, a C(1-4) alkyl, substituted by a hydrophilic group, as defined herein, is included under the phrase "hydrophilic group" herein.

Alkene and alkyne, as used herein, are an alkyl, as defined herein, which contains one or more double bond or triple bond, respectively.

The term "cycloalkyl" describes an all-carbon monocyclic ring or fused rings (i.e., rings which share an adjacent pair of carbon atoms) group where one or more of the rings does not have a completely conjugated pi-electron system. Examples include, without limitation, cyclohexane, adamantine, norbornyl, isobornyl, and the like. The cycloalkyl group may be substituted or unsubstituted. Substituted cycloalkyl may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, N-carbamate, O-carbamate, C-amide, N-amide, guanyl, guanidine and hydrazine. The cycloalkyl group can be an end group, as this phrase is defined hereinabove, wherein it is attached to a single adjacent atom, or a linking group, as this phrase is defined hereinabove, connecting two or more moieties at two or more positions thereof.

Cycloalkyls of 1-6 carbon atoms, substituted by two or more hydrophilic groups, as defined herein, is included under the phrase "hydrophilic group" herein.

The term "heteroalicyclic" describes a monocyclic or fused ring group having in the ring(s) one or more atoms such as nitrogen, oxygen and sulfur. The rings may also have one or more double bonds. However, the rings do not have a completely conjugated pi-electron system. Representative examples are piperidine, piperazine, tetrahydrofurane, tetrahydropyrane, morpholino, oxalidine, and the like.

The heteroalicyclic may be substituted or unsubstituted. Substituted heteroalicyclic may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, O-carbamate, N-carbamate, C-amide, N-amide, guanyl, guanidine and hydrazine. The heteroalicyclic group can be an end group, as this phrase is defined hereinabove, where it is attached to a single adjacent atom, or a linking group, as this phrase is defined hereinabove, connecting two or more moieties at two or more positions thereof.

A heteroalicyclic group which includes one or more of electron-donating atoms such as nitrogen and oxygen, and in which a numeral ratio of carbon atoms to heteroatoms is 5:1 or lower, is included under the phrase "hydrophilic group" herein.

The term "aryl" describes an all-carbon monocyclic or fused-ring polycyclic (i.e., rings which share adjacent pairs of carbon atoms) groups having a completely conjugated pi-electron system. The aryl group may be substituted or unsubstituted. Substituted aryl may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, N-carbamate, O-carbamate, C-amide, N-amide, guanyl, guanidine and hydrazine. The aryl group can be an end group, as this term is defined hereinabove, wherein it is attached to a single adjacent atom, or a linking group, as this term is defined hereinabove, connecting two or more moieties at two or more positions thereof.

The term "heteroaryl" describes a monocyclic or fused ring (i.e., rings which share an adjacent pair of atoms) group having in the ring(s) one or more atoms, such as, for example, nitrogen, oxygen and sulfur and, in addition, having a completely conjugated pi-electron system. Examples, without limitation, of heteroaryl groups include pyrrole, furan, thiophene, imidazole, oxazole, thiazole, pyrazole, pyridine, pyrimidine, quinoline, isoquinoline and purine. The heteroaryl group may be substituted or unsubstituted. Substituted heteroaryl may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, O-carbamate, N-carbamate, C-amide, N-amide, guanyl, guanidine and hydrazine. The heteroaryl group can be an end group, as this phrase is defined hereinabove, where it is attached to a single adjacent atom, or a linking group, as this phrase is defined hereinabove, connecting two or more moieties at two or more positions thereof. Representative examples are pyridine, pyrrole, oxazole, indole, purine and the like.

The term "halide" and "halo" describes fluorine, chlorine, bromine or iodine.

The term "haloalkyl" describes an alkyl group as defined above, further substituted by one or more halide.

The term "sulfate" describes a —O—S(=O)$_2$—OR' end group, as this term is defined hereinabove, or an —O—S(=O)$_2$—O— linking group, as these phrases are defined hereinabove, where R' is as defined hereinabove.

The term "thiosulfate" describes a —O—S(=S)(=O)—OR' end group or a —O—S(=S)(=O)—O— linking group, as these phrases are defined hereinabove, where R' is as defined hereinabove.

The term "sulfite" describes an —O—S(=O)—O—R' end group or a —O—S(=O)—O— group linking group, as these phrases are defined hereinabove, where R' is as defined hereinabove.

The term "thiosulfite" describes a —O—S(=S)—O—R' end group or an —O—S(=S)—O— group linking group, as these phrases are defined hereinabove, where R' is as defined hereinabove.

The term "sulfinate" describes a —S(=O)—OR' end group or an —S(=O)—O— group linking group, as these phrases are defined hereinabove, where R' is as defined hereinabove. The term "sulfoxide" or "sulfinyl" describes a —S(=O)R' end group or an —S(=O)— linking group, as these phrases are defined hereinabove, where R' is as defined hereinabove.

The term "sulfonate" describes a —S(=O)$_2$—R' end group or an —S(=O)$_2$— linking group, as these phrases are defined hereinabove, where R' is as defined herein.

The term "S-sulfonamide" describes a —S(=O)$_2$—NR'R" end group or a —S(=O)$_2$—NR'-linking group, as these phrases are defined hereinabove, with R' and R" as defined herein.

The term "N-sulfonamide" describes an R'S(=O)$_2$—NR"— end group or a —S(=O)$_2$—NR'— linking group, as these phrases are defined hereinabove, where R' and R" are as defined herein.

The term "disulfide" refers to a —S—SR' end group or a —S—S— linking group, as these phrases are defined hereinabove, where R' is as defined herein.

The term "phosphonate" describes a —P(=O)(OR')(OR") end group or a —P(=O)(OR')(O)— linking group, as these phrases are defined hereinabove, with R' and R" as defined herein.

The term "thiophosphonate" describes a —P(=S)(OR')(OR") end group or a —P(=S)(OR')(O)— linking group, as these phrases are defined hereinabove, with R' and R" as defined herein.

The term "phosphinyl" describes a —PR'R" end group or a —PR'— linking group, as these phrases are defined hereinabove, with R' and R" as defined hereinabove.

The term "phosphine oxide" describes a —P(=O)(R')(R") end group or a —P(=O)(R')— linking group, as these phrases are defined hereinabove, with R' and R" as defined herein.

The term "phosphine sulfide" describes a —P(=S)(R')(R") end group or a —P(=S)(R')— linking group, as these phrases are defined hereinabove, with R' and R" as defined herein.

The term "phosphite" describes an —O—PR'(=O)(OR") end group or an —O—PH(=O)(O)— linking group, as these phrases are defined hereinabove, with R' and R" as defined herein.

The term "carbonyl" or "carbonate" as used herein, describes a —C(=O)—R' end group or a —C(=O)— linking group, as these phrases are defined hereinabove, with R' as defined herein.

The term "thiocarbonyl" as used herein, describes a —C(=S)—R' end group or a —C(=S)— linking group, as these phrases are defined hereinabove, with R' as defined herein.

The term "oxo" as used herein, describes a (=O) group, wherein an oxygen atom is linked by a double bond to the atom (e.g., carbon atom) at the indicated position.

The term "thiooxo" as used herein, describes a (=S) group, wherein a sulfur atom is linked by a double bond to the atom (e.g., carbon atom) at the indicated position.

The term "oxime" describes a =N—OH end group or a =N—O— linking group, as these phrases are defined hereinabove.

The term "hydroxyl" describes a —OH group.

The term "alkoxy" describes both an —O-alkyl and an —O-cycloalkyl group, as defined herein.

The term "aryloxy" describes both an —O-aryl and an —O-heteroaryl group, as defined herein. The term "thiohydroxy" describes a —SH group.

The term "thioalkoxy" describes both a —S-alkyl group, and a —S-cycloalkyl group, as defined herein.

The term "thioaryloxy" describes both a —S-aryl and a —S-heteroaryl group, as defined herein.

The "hydroxyalkyl" is also referred to herein as "alcohol", and describes an alkyl, as defined herein, substituted by a hydroxy group.

The term "cyano" describes a —C≡N group.

The term "isocyanate" describes an —N=C=O group.

The term "isothiocyanate" describes an —N=C=S group.

The term "nitro" describes an —NO$_2$ group.

The term "acyl halide" describes a —(C=O)R'''' group wherein R'''' is halide, as defined hereinabove.

The term "azo" or "diazo" describes an —N=NR' end group or an —N=N— linking group, as these phrases are defined hereinabove, with R' as defined hereinabove.

The term "peroxo" describes an —O—OR' end group or an —O—O— linking group, as these phrases are defined hereinabove, with R' as defined hereinabove.

The term "carboxylate" as used herein encompasses C-carboxylate and O-carboxylate. The term "C-carboxylate" describes a —C(=O)—OR' end group or a —C(=O)—O— linking group, as these phrases are defined hereinabove, where R' is as defined herein.

The term "O-carboxylate" describes a —OC(=O)R' end group or a —OC(=O)— linking group, as these phrases are defined hereinabove, where R' is as defined herein.

A carboxylate can be linear or cyclic. When cyclic, R' and the carbon atom are linked together to form a ring, in C-carboxylate, and this group is also referred to as lactone. Alternatively, R' and O are linked together to form a ring in O-carboxylate. Cyclic carboxylates can function as a linking group, for example, when an atom in the formed ring is linked to another group.

The term "thiocarboxylate" as used herein encompasses C-thiocarboxylate and O-thiocarboxylate.

The term "C-thiocarboxylate" describes a —C(=S)—OR' end group or a —C(=S)—O— linking group, as these phrases are defined hereinabove, where R' is as defined herein.

The term "O-thiocarboxylate" describes a —OC(=S)R' end group or a —OC(=S)— linking group, as these phrases are defined hereinabove, where R' is as defined herein.

A thiocarboxylate can be linear or cyclic. When cyclic, R' and the carbon atom are linked together to form a ring, in C-thiocarboxylate, and this group is also referred to as thiolactone. Alternatively, R' and O are linked together to form a ring in O-thiocarboxylate. Cyclic thiocarboxylates can function as a linking group, for example, when an atom in the formed ring is linked to another group.

The term "carbamate" as used herein encompasses N-carbamate and O-carbamate.

The term "N-carbamate" describes an R''OC(=O)—NR'— end group or a —OC(=O)—NR'-linking group, as these phrases are defined hereinabove, with R' and R'' as defined herein.

The term "O-carbamate" describes an —OC(=O)—NR'R'' end group or an —OC(=O)—NR'— linking group, as these phrases are defined hereinabove, with R' and R'' as defined herein.

A carbamate can be linear or cyclic. When cyclic, R' and the carbon atom are linked together to form a ring, in O-carbamate. Alternatively, R' and O are linked together to form a ring in N-carbamate. Cyclic carbamates can function as a linking group, for example, when an atom in the formed ring is linked to another group.

The term "carbamate" as used herein encompasses N-carbamate and O-carbamate.

The term "thiocarbamate" as used herein encompasses N-thiocarbamate and O-thiocarbamate.

The term "O-thiocarbamate" describes a —OC(=S)—NR'R'' end group or a —OC(=S)—NR'— linking group, as these phrases are defined hereinabove, with R' and R'' as defined herein.

The term "N-thiocarbamate" describes an R''OC(=S)NR'— end group or a —OC(=S)NR'-linking group, as these phrases are defined hereinabove, with R' and R'' as defined herein.

Thiocarbamates can be linear or cyclic, as described herein for carbamates.

The term "dithiocarbamate" as used herein encompasses S-dithiocarbamate and N-dithiocarbamate.

The term "S-dithiocarbamate" describes a —SC(=S)—NR'R'' end group or a —SC(=S)NR'— linking group, as these phrases are defined hereinabove, with R' and R'' as defined herein.

The term "N-dithiocarbamate" describes an R''SC(=S)NR'— end group or a —SC(=S)NR'-linking group, as these phrases are defined hereinabove, with R' and R'' as defined herein.

The term "urea", which is also referred to herein as "ureido", describes a —NR'C(=O)—NR''R''' end group or a —NR'C(=O)—NR''— linking group, as these phrases are defined hereinabove, where R' and R'' are as defined herein and R''' is as defined herein for R' and R''.

The term "thiourea", which is also referred to herein as "thioureido", describes a —NR'—C(=S)—NR''R''' end group or a —NR'—C(=S)—NR''— linking group, with R', R'' and R''' as defined herein.

The term "amide" as used herein encompasses C-amide and N-amide.

The term "C-amide" describes a —C(=O)—NR'R'' end group or a —C(=O)—NR'— linking group, as these phrases are defined hereinabove, where R' and R'' are as defined herein.

The term "N-amide" describes a R'C(=O)—NR''— end group or a R'C(=O)—N— linking group, as these phrases are defined hereinabove, where R' and R'' are as defined herein.

An amide can be linear or cyclic. When cyclic, R' and the carbon atom are linked together to form a ring, in C-amide, and this group is also referred to as lactam. Cyclic amides can function as a linking group, for example, when an atom in the formed ring is linked to another group.

The term "guanyl" describes a R'R''NC(=N)— end group or a —R'NC(=N)— linking group, as these phrases are defined hereinabove, where R' and R'' are as defined herein.

The term "guanidine" describes a —R'NC(=N)—NR''R''' end group or a —R'NC(=N)— NR''— linking group, as these phrases are defined hereinabove, where R', R'' and R''' are as defined herein.

The term "hydrazine" describes a —NR'—NR''R''' end group or a —NR'—NR''— linking group, as these phrases are defined hereinabove, with R', R'', and R''' as defined herein.

As used herein, the term "hydrazide" describes a —C(=O)—NR'—NR"R''' end group or a —C(=O)—NR'—NR"— linking group, as these phrases are defined hereinabove, where R', R" and R''' are as defined herein.

As used herein, the term "thiohydrazide" describes a —C(=S)—NR'—NR"R''' end group or a —C(=S)—NR'—NR"— linking group, as these phrases are defined hereinabove, where R', R" and R''' are as defined herein.

As used herein, the term "alkylene glycol" describes a —O—[(CR'R")$_z$—O]$_y$R''' end group or a —O—[(CR'R")$_z$—O]$_y$ linking group, with R', R" and R''' being as defined herein, and with z being an integer of from 1 to 10, preferably, from 2 to 6, more preferably 2 or 3, and y being an integer of 1 or more. Preferably R' and R" are both hydrogen. When z is 2 and y is 1, this group is ethylene glycol. When z is 3 and y is 1, this group is propylene glycol. When y is 2-4, the alkylene glycol is referred to herein as oligo(alkylene glycol).

When y is greater than 4, the alkylene glycol is referred to herein as poly(alkylene glycol). In some embodiments of the present invention, a poly(alkylene glycol) group or moiety can have from 10 to 200 repeating alkylene glycol units, such that z is 10 to 200, preferably 10-100, more preferably 10-50.

The term "silanol" describes a —Si(OH)R'R" group, or —Si(OH)$_2$R' group or —Si(OH)$_3$ group, with R' and R" as described herein.

The term "silyl" describes a —SiR'R"R"' group, with R', R" and R''' as described herein.

As used herein, the term "urethane" or "urethane moiety" or "urethane group" describes a Rx-O—C(=O)—NR'R" end group or a —Rx—O—C(=O)—NR'— linking group, with R' and R" being as defined herein, and Rx being an alkyl, cycloalkyl, aryl, alkylene glycol or any combination thereof. Preferably R' and R" are both hydrogen.

The term "polyurethane" or "oligourethane" describes a moiety that comprises at least one urethane group as described herein in the repeating backbone units thereof, or at least one urethane bond, —O—C(=O)—NR'—, in the repeating backbone units thereof.

Herein throughout, whenever the phrase "weight percents", or "% by weight" or "% wt.", is indicated in the context of embodiments of a formulation (e.g., a modeling formulation), it is meant weight percents of the total weight of the respective uncured formulation.

CT numbers provided herein throughout are at 70 kV, unless otherwise indicated.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non-limiting fashion.

Materials and Methods

VeroClear™, marketed by the present Assignee, was used as an exemplary curable formulation.

VeroWhite™, marketed by the present Assignee, was used as an exemplary reference formulation.

3-bromo-2,2-bisbromomethyl)propyl acrylate (Trinol) was purchased from ICL-IP America Inc.

Potassium iodide was purchased from Sigma-Aldrich Israel Ltd.

Tungsten (W) Powder was purchased from US Research Nanomaterials, Inc.

Tantalum (Ta) powder was obtained from US Research Nanomaterials, Inc.

Barium sulfate nanoparticles were obtained from American Elements. Tungsten disulfide nanoparticles (30%) dispersion in ethylene glycol was obtained from US Research Nanomaterials, Inc.

All formulations were prepared while mixing a curable formulation with the radiopaque material, and optionally further with a surface active agent and/or a non-reactive or reactive diluent.

Mold preparations were molded bars featuring the following dimensions: 65×12.5×10 mm. Curing was effected in a UV chamber.

Printed objects were prepared using Connex3 printer, and bars having the following dimensions: 65×12.5×10 mm were printed.

CT numbers (HU) were determined for the prepared phantom in air, unless otherwise indicated. Formulations referred to as A1, A3, B, C1, C3, D1, E1, G1 were tested in 25 cm water. CT numbers were measured at various kV values, with a scanner input (CTDIvol) of 32 mGy. Reconstruction was made with Qr40 kernel and 1 mm slice thickness. CT numbers provided herein are as measured at 70 kV, unless otherwise indicated.

Viscosity was determined using Brookfield DV-E viscometer, model LVDV230 DATA, at 75° C.

Tensile Strength was determined according to ASTM D638.

Elongation at break was determined according to ASTM D638.

Flexural Strength was determined according to ASTM D790.

Flexural modulus was determined according to ASTM D790.

HDT was determined according to ASTM D648.

Example 1

Formulations with Curable Radiopaque Materials

The following exemplary formulations, also referred to herein as Set A formulations, were successfully prepared, generally by mixing Trinol acrylate (3-bromo-2,2-bis(bromomethyl)propyl acrylate; abbreviated herein as "Trinol") and Veroclear™ or a similar formulation as the curable formulation, at various weight ratios, as follows:

A1=5% Trinol+95% Veroclear™.
A2=10% Trinol+90% Veroclear™.
A3=25% Trinol+75% Veroclear™.

A4=50% Trinol+50% Veroclear™.
A5=15% Trinol+85% Veroclear™.
A6=20% Trinol+80% Veroclear™.

The viscosity of these formulations meets the requirement of a PolyJet® system, and ranges from 8 to 20 centipoises at 75° C.

The surface tension of these formulations at 25° C. was in a range of 25-30 mN/m.

All formulations were jettable.

Table 2 below presents the CT number at 70 kV, as determined for mold preparations prepared from some of the Set A formulations.

TABLE 2

| Formulations | CT Number at 70 kV (HU) |
|---|---|
| A1 | 700-800 |
| A2 | 1200-1400 |
| A3 | 2500-3000 |
| A4 | 3000-3200 |

Table 3 below presents the CT number at 70 kV, as determined for printed objects obtained using some of the Set A formulations.

TABLE 3

| Formulations | CT Number at 70 kV (HU) |
|---|---|
| A1 | 600-700 |
| A3 | 2500-3000 |
| A5 | 3000-3100 |
| A6 | 2000-2500 |

Additional formulations, referred to herein as Set F formulations, are prepared generally by mixing pentabromobenzyl acrylate and Veroclear™ as the curable formulation, at various weight ratios.

An exemplary such formulation, containing 10% pentabromobenzyl acrylate was successfully prepared and a mold preparation obtained therefrom exhibited CT number of 1300-1400 HU.

Example 2

Formulations with Iodine-Containing Non-Curable Materials

The following exemplary formulations, also referred to herein as Set B formulations, were successfully prepared, generally by mixing potassium iodide (KI) and curable materials (e.g., a mixture of one or more monofunctional acrylate(s) and one or more multifunctional (e.g., di-functional) acrylate(s), at various weight ratios.

An exemplary formulation B comprises: about 3-8% KI+about 75-85% monofunctional acrylate+10-15% Polyether Urethane acrylate/diacrylate+3-4% photoinitiator(s)+inhibitor and/or surfactant (up to 0.2%), with all percentages relate to % weight.

The CT number for a mold preparation prepared from this formulation was 2000-2200 HU.

The viscosity of these formulations meets the requirement of a PolyJet® system, and ranges from 8 to 20 centipoises at 75° C.

The surface tension of these formulations at 25° C. was in a range of 25-30 mN/m.

Example 3

Formulations with an Opaque Material Dispersed in a Curable Carrier

The following exemplary formulations, also referred to herein as Set C formulations, were successfully prepared, generally by mixing a dispersion of 49% wt. of $Al_2O_3$ in a curable carrier as described herein and Veroclear™ or a similar formulation as the curable formulation, at various weight ratios, as follows:

C1=5% of 49% alumina dispersion in a curable carrier+95% Veroclear™.
C2=10% of 49% alumina dispersion in a curable carrier+90% Veroclear™.
C3=25% of 49% alumina dispersion in a curable carrier+75% Veroclear™.

The CT numbers measured for mold preparations obtained from Set C formulations are presented in Table 4.

TABLE 4

| Formulations | CT Number at 70 kV (HU) |
|---|---|
| C1 | <150 |
| C2 | <150 |
| C3 | 150-200 |

Example 4

Formulations of Tungsten Particles

The following exemplary formulations, also referred to herein as Set D formulations, were successfully prepared, generally by mixing Tungsten nanopowder and Veroclear™ or a similar formulation as the curable formulation, at various weight ratios, as follows:

D1=10% Tungsten nanopowder+90% Veroclear™.
D2=20% Tungsten nanopowder+80% Veroclear™.

Another set of exemplary formulations, also referred to herein as set G, was prepared generally by mixing a dispersion of tungsten disulfide particles (30% by weight) in ethylene glycol and Veroclear™ or a similar formulation as the curable formulation, at various weight ratios, as follows:

G1=25% Tungsten disulfide dispersion+75% Veroclear™.
G2=50% Tungsten disulfide dispersion+50% Veroclear™.

The CT numbers measured for mold preparations obtained from Set D and Set F formulations are presented in Table 5.

TABLE 5

| Formulations | CT Number at 70 kV (HU) |
|---|---|
| D1 | 1000-1500 |
| D2 | >3000 |
| G1 | 200-250 |
| G2 | 250-300 |

Example 5

Formulations of Tantalum Nanopowder

The following exemplary formulations, also referred to herein as Set E formulations, were successfully prepared, generally by mixing Tantalum nanopowder and Veroclear™ or a similar formulation as the curable formulation, at various weight ratios, as follows:

E1=10% Tantalum nanopowder+90% Veroclear™.
E2=20% Tantalum nanopowder+80% Veroclear™.

Both formulations exhibited CT numbers between 150 and 250 HU.

Example 6

Formulations of Barium Sulfate

The following exemplary formulations, also referred to herein as Set H formulations, were successfully prepared, generally by mixing barium sulfate nanoparticles and Veroclear™ or a similar formulation as the curable formulation, at various weight ratios, such that an amount of Barium sulfate nanoparticles ranged from 5 to 30% and the amount of the curable formulation from 95 to 70% by weight. Barium sulfate, along with an additional surfactant or dispersant, as follows:

H1=about 5% Barium sulfate+about 95% Veroclear™.
H2=about 10% Barium sulfate+about 90% Veroclear™.
H3=about 20% Barium sulfate+about 80% Veroclear™.
H4=about 30% Barium sulfate+about 70% Veroclear™.

All formulations included a photoinitiator in a higher amount of, e.g., more than 5% by weight, for example, 5-7% by weight.

The viscosity of these formulations meets the requirement of a PolyJet® system, and ranges from 8 to 20 centipoises at 75° C.

The surface tension of these formulations at 25° C. was in a range of 25-30 mN/m.

All formulations were jettable.

These formulations were successfully utilized for fabricating printed objects. Table 6 below presented the CT numbers of the printed objects.

TABLE 6

| Formulations | CT Number at 70 kV (HU) |
| --- | --- |
| H1 | 1500-2000 |
| H2 | 3200-3500 |
| H3 | 6800-7000 |
| H4 | above 10000 |

Table 7 below presents the mechanical properties of the printed objects.

TABLE 7

| Property | H3 |
| --- | --- |
| HDT (C) | About 44 |
| Tensile Strength (MPa) | About 65 |
| Elongation at break (%) | About 8.5 |
| Flexural strength (MPa) | About 67 |
| Flexural Modulus (MPa) | About 2050 |

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

In addition, any priority document(s) of this application is/are hereby incorporated herein by reference in its/their entirety.

What is claimed is:

1. A modeling material formulation usable in additive manufacturing of a three-dimensional object, the formulation comprising:
   one or more curable materials which are photopolymerizable materials that polymerize and/or undergo cross-linking upon exposure to radiation; and
   a radiopaque material in an amount that ranges from 5 to 50%, by weight of the total weight of the formulation,
   wherein said radiopaque material is a curable material which is a photopolymerizable material that polymerizes and/or undergoes cross-linking upon exposure to radiation and which contains one or more photocurable groups and one or more radiopaque elements or one or more groups containing a radiopaque element, wherein said radiopaque element is bromine,
   and wherein said one or more curable materials comprise one or more monofunctional curable material(s) featuring, when hardened, Tg lower than 20° C. and/or one or more multifunctional curable material(s) featuring, when hardened, Tg lower than 20° C.,
   the formulation featuring, when hardened, a CT number of at least 100 HU at 70 kV.

2. The formulation of claim 1, featuring, when hardened, a CT number of at least 500 HU at 70 kV.

3. The formulation of claim 1, wherein the three-dimensional object is a radiological phantom.

4. The formulation of claim 1, wherein the additive manufacturing is 3D inkjet printing.

5. The formulation of claim 1, featuring a viscosity of from 8 to about 50, centipoises at 75° C.

6. The formulation of claim 1, wherein an amount of said radiopaque material ranges from 5 to 30%, by weight of the total weight of the formulation.

7. The formulation of claim 1, wherein said curable materials are UV-curable materials which polymerize and/or undergo cross-linking upon exposure to UV irradiation.

8. The formulation of claim 7, further comprising a photoinitiator.

9. The formulation of claim 8, wherein an amount of said photoinitiator ranges from 2 to 6%, by weight of total weight of the formulation.

10. The formulation of claim 1, wherein said one or more curable materials comprise one or more monofunctional curable material(s) featuring, when hardened, Tg higher than 50° C.

11. The formulation of claim 10, wherein a total amount of said one or more monofunctional curable material(s) that features, when hardened, Tg higher than 50° C. ranges from 20% to 40%, by weight of total weight of the formulation.

12. The formulation of claim 1, wherein a total amount of said one or more monofunctional curable material(s) featuring, when hardened, Tg lower than 20° C. ranges from 5 to 15, % by weight of the total weight of the formulation.

13. The formulation of claim 1, wherein said one or more curable materials comprise one or more multifunctional curable material(s) featuring, when hardened, Tg higher than 50° C.

14. The formulation of claim 13, wherein a total amount of said one or more multifunctional curable material(s) featuring, when hardened, Tg higher than 50° C. ranges from 5% to 15%, by weight of total weight of the formulation.

15. The formulation of claim 1, wherein a total amount of said one or more multifunctional curable material(s) featuring, when hardened, Tg lower than 20° C. ranges from 15 to 25, % by weight of the total weight of the formulation.

16. A method of additive manufacturing a three-dimensional object, the method comprising dispensing at least one modeling material formulation to sequentially form a plurality of layers in a configured pattern corresponding to a shape of the object, wherein for at least a portion of said layers, said at least one modeling material formulation is the formulation of claim 1.

17. The method of claim 16, wherein said dispensing is via one or more 3D inkjet printing arrays.

18. The method of claim 16, further comprising exposing at least a portion of the dispensed layers to a curing condition to thereby obtain a hardened formulation featuring said CT number, said curing condition comprising irradiation.

19. A three-dimensional object comprising, in at least a portion thereof, a hardened material that features a CT number of at least 100 HU at 70 kV, obtained by the method of claim 16.

* * * * *